(12) United States Patent
Ferringer et al.

(10) Patent No.: US 8,862,627 B2
(45) Date of Patent: Oct. 14, 2014

(54) SYSTEMS AND METHODS FOR AUTO-ADAPTIVE CONTROL OVER CONVERGED RESULTS FOR MULTI-DIMENSIONAL OPTIMIZATION

(75) Inventors: Matthew Phillip Ferringer, Round Hill, VA (US); Timothy Guy Thompson, Purcellville, VA (US)

(73) Assignee: The Aerospace Corporation, El Segundo, CA (US)

( * ) Notice: Subject to any disclaimer, the term of this patent is extended or adjusted under 35 U.S.C. 154(b) by 717 days.

(21) Appl. No.: 13/194,424

(22) Filed: Jul. 29, 2011

(65) Prior Publication Data

US 2013/0031140 A1    Jan. 31, 2013

(51) Int. Cl.
*G06N 3/12* (2006.01)
*G06F 17/30* (2006.01)

(52) U.S. Cl.
CPC .......... *G06N 3/126* (2013.01); *G06F 17/30286* (2013.01)
USPC ............................................ 707/793; 706/13

(58) Field of Classification Search
CPC ..................................................... G06N 3/126
See application file for complete search history.

(56) References Cited

U.S. PATENT DOCUMENTS

| | | | |
|---|---|---|---|
| 5,568,590 A | 10/1996 | Tolson | |
| 6,532,076 B1 | 3/2003 | Sidorowich | |
| 7,660,773 B1 * | 2/2010 | Kumar | 706/13 |
| 7,987,143 B2 * | 7/2011 | Goel | 706/13 |
| 7,996,344 B1 | 8/2011 | Goel | |
| 8,069,127 B2 | 11/2011 | Taylor et al. | |
| 8,255,344 B2 * | 8/2012 | Ferringer et al. | 706/13 |
| 8,255,345 B2 * | 8/2012 | Ferringer et al. | 706/13 |
| 8,285,653 B2 | 10/2012 | Ferringer et al. | |
| 8,433,662 B2 | 4/2013 | Ferringer et al. | |
| 8,560,472 B2 * | 10/2013 | Ferringer et al. | 706/13 |
| 2008/0010044 A1 | 1/2008 | Ruetsch | |
| 2010/0292929 A1 | 11/2010 | Ferringer et al. | |
| 2010/0293120 A1 | 11/2010 | Ferringer et al. | |
| 2010/0293122 A1 | 11/2010 | Ferringer et al. | |
| 2010/0293313 A1 * | 11/2010 | Ferringer et al. | 710/110 |

(Continued)

OTHER PUBLICATIONS

Kirley, Michael, and Robert Stewart. "An analysis of the effects of population structure on scalable multiobjective optimization problems." In Proceedings of the 9th annual conference on Genetic and evolutionary computation, pp. 845-852. ACM, 2007.*

(Continued)

*Primary Examiner* — Sherief Badawi
*Assistant Examiner* — Jesse P Frumkin
(74) *Attorney, Agent, or Firm* — Sutherland Asbill & Brennan LLP

(57) ABSTRACT

Systems and methods may include identifying an input population of parent epsilon chromosome data structures; combining genes of each selected pair of parent epsilon chromosome data structures according to at least one evolutionary operator to generate a plurality of child epsilon chromosome data structures, each child epsilon chromosome data structure providing one or more genes each having a respective candidate epsilon value representing a respective step size or spacing for the respective problem objective; and evaluating each of the plurality of child epsilon chromosome data structures according to one or more epsilon objective functions to generate respective epsilon objective function values for each child epsilon chromosome data structure, where each epsilon objective function is associated with a respective goal associated with at least one a priori criterion, where each respective epsilon objective function value indicates an extent to which each respective goal can be achieved.

18 Claims, 22 Drawing Sheets

(56) References Cited

U.S. PATENT DOCUMENTS

| | | |
|---|---|---|
| 2011/0078100 A1 | 3/2011 | Goel |
| 2012/0084314 A1 | 4/2012 | Ferringer et al. |
| 2012/0197830 A1* | 8/2012 | Hadka et al. .................... 706/13 |

OTHER PUBLICATIONS

Zhao, Shi-Zheng, and Ponnuthurai Nagaratnam Suganthan. "Multi-objective evolutionary algorithm with ensemble of external archives." International Journal of Innovative Computing, Information and Control 6, No. 1 (2010): 1713-1726.*

Cheng, Yu, Yongjie Jin, and Jinglu Hu. "Adaptive epsilon non-dominated sorting multi-objective evolutionary optimization and its application in shortest path problem." In ICCAS-SICE, 2009, pp. 2545-2549. IEEE, 2009.*

Aguirre, Hernan, and Kiyoshi Tanaka. "Adaptive∈-ranking on MNK-Landscapes." In Computational intelligence in miulti-criteria decision-making, 2009. mcdm'09. ieee symposium on, pp. 104-111. IEEE, 2009.*

Matthew P. Ferringer et al., "Efficient and Accurate Evolutionary Multi-Objective Optimization Paradigms for Satellite Constellation Design." Journal of Spacecraft and Rockets. vol. 44, No. 3, May-Jun. 2007. 682-691.

Patrick M. Reed et al., "Parallel Evolutionary Multi-Objective Optimization on Large, Heterogeneous Clusters: An Applications Perspective." Journal of Aerospace Computing, Information, and Communication. vol. 5, Nov. 2008. 460-478.

J.B. Kollat et al., "A Computational Scaling Analysis of Multiobjective Evolutionary Algorithms in Long-Term Groundwater Monitoring Applications." Advances in Water Resources. Jan. 25, 2006. 1-24.

Y. Tang et al., "Parallelization Strategies for Rapid and Robust Evolutionary Multiobjective Optimization in Water Resources Applications." Advances in Water Resources. Mar. 29, 2006. 1-39.

J.B. Kollat et al., "Comparing state-of-the-art evolutionary multi-objective algorithms for long-term groundwater monitoring design." Advances in Water Resources 29 (2006): 792-807. <www.elsevier.com/locate/advwatres>.

Kalyanmoy Deb et al., "Evaluating the epsilon-Domination Based Multi-Objective Evolutionary Algorithm for a Quick Computation of Pareto-Optimal Solutions." Evolutionary Computation (13)4: 501-525.

Joshua B. Kollat et al., "The Value of Online Adaptive Search: A Performance Comparison of NSGAII, epsilon-NSGAII and epsilonMOEA." Springer-Verlag Berlin Heidelberg 2005. 386-398.

Kalyanmoy Deb et al., "A Fast and Elitist Multi-Objective Genetic Algorithm: NSGA-II" KanGAL Report No. 200001. 20 pages.

Matthew P. Ferringer et al., "Many-objective Reconfiguration of Operational Satellite Constellations with the Large-Cluster Epsilon Non-domination Sorting Genetic Algorithm-II." The Aerospace Corporation's Independent Research and Development Program. Oct. 31, 2008. 10 pages.

David A. Van Veldhuizen et al., "Considerations in Engineering Parallel Multiobjective Evolutionary Algorithms." IEEE Transactions on Evolutionary Computation. vol. 7, No. 2, Apr. 2003. 144-173.

Matthew P. Ferringer et al., "Satellite Constellation Design Tradeoffs Using Multiple-Objective Evolutionary Computation." Journal of Spacecraft and Rockets. vol. 43, No. 6, Nov.-Dec. 2006. 1404-1411.

Search Report and Written Opinion for International Application No. PCT/US2010/034955 mailed Aug. 17, 2010.

Matthew P. Ferringer, "General Framework for the Reconfiguration of Satellite Constellations." <http://etda.libraries.psu.edu/theses/approved/WorldWideIndex/ETD-3537/Index.html>, 40 pages.

Matthew P. Ferringer et al., "Pareto-hypervolumes for the Reconfiguration of Satellite Constellations." AIAA/AAS Astrodynamics Specialist Conference and Exhibit. Aug. 18-21, 2008, p. 1-31.

Yong Tang, "Advancing Hydrologic Model Evaluation and Identification Using Multiobjective Calibration Sensitivity Analysis and Parallel Computation." ProQuest Information and Learning Company. 2007, 48 pages.

Scott Zimmer et al., "Utilizing Evolutionary Algorithms for Problems with Vast Infeasible Regions and Expensive Function Evaluations." The Aerospace Corporation. Jun. 27, 2008, 12 pages.

Theodore R. Stodgell et al., "Satellite Rendezvous Tours Using Multiobjective Evolutionary Optimization." The Pennsylvania State University. 28 pages.

Joshua B. Kollat et al., "A Framework for Visually Interactive Decision-making and Design using Evolutionary Multi-objective Optimization (VIDEO)" Environmental Modelling & Software 22. 2007, 1691-1704.

Joshua B. Kollat et al., "A New Epsilon-Dominance Hierarchical Bayesian Optimization Algorithm for Large Multiobjective Monitoring Network Design Problems" Advances in Water Resources 31. 2008, 828-845.

Allison Barker, "Aerospace Competes in International Global Trajectory Optimization Competition." Orbiter. vol. 48, No. 3. Mar. 27, 2008, 1 pages.

Anonymous, <http://www.apptimation.com/Technology/Technology.html>, 1 page.

Related U.S. Appl. No. 13/799,819 Thompson et al. filed Mar. 13, 2013.

Related U.S. Appl. No. 13/837,782 Smith et al. filed Mar. 15, 2013.

Muhlenbein, Heinz et al.; "Evolution in time and space—the parallel genetic algorithm."; 1991; Morgan Kaufmann; pp. 1-22.

Cantu-Paz, Erick et al.; "Efficient parallel genetic algorithms: theory and practice." 2000; Comput. Methods Appl. Mech. Engrg. 186 (2000) pp. 221-238; Elsevier Science S.A.

Laumanns, Marco et al.; "Combining Convergence and Diversity in Evolutionary Multi-Objective Optimization"; 2002; Massachusetts Institute of Technology; Evolutionary Computation 10(3); pp. 1-21.

Deb, Kalyanmoy et al.; "Omni-Optimizer: A generic evolutionary algorithm for single and multi-objective optimization"; 2006; Elsevier; European Journal of Operational Research 185 (2008); pp. 1062-1087.

Ventura, Sebastian et al.; "JCLEC: a Java framework for evolutionary computation"; 2007; Springer-Verlag; pp. 381-392.

Chuang, Angela S. et al.; "An Extensible Genetic Algorithm Framework for Problem Solving in a Common Environment"; 2000; IEEE; Transactions on Power Systems, vol. 15, No. 1; pp. 269-275.

Tan, K. C. et al.; "A Multiobjective Evolutionary Algorithm Toolbox for Computer-Aided Multiobjective Optimization"; 2001; IEEE; Transactions on Systems, Man, and Cybernetics—Part B: Cybernetics, vol. 31, No. 4; pp. 537-556.

Shajulin Benedict and V. Vasudevan, "Scheduling of Scientific Workflows Using Niched Pareto GA for Grids"; 2006, IEEE pp. 908-912.

David A. Van Veldhuizen et al., "(Final Draft) TR-98-03 Multiobjective Evolutionary Algorithm Research: A History and Analysis" Oct. 14, 1998; pp. 1-30.

Jeffrey Horn, et al.; "A Niched Pareto Genetic Algorithm for Multiobjective Optimization" 1994; IEEE; pp. 82-87.

Mark Erickson et al.; Multi-objective Optimal Design of Groundwater Remediation Systems: Application of the Niced Pareto Genetic Algorithm (NPGA); Advances in Water Resources 25 (2002); pp. 51-65.

Y. Tang et al., "Parallelization Strategies for Rapid and Robust Evolutionary Multiobjective Optimization in Water Resources Applications." Advances in Water Resources 30. 2007, 335-353.

* cited by examiner

SYSTEMS AND METHODS FOR AUTO-ADAPTIVE CONTROL OVER CONVERGED RESULTS FOR MULTI-DIMENSIONAL OPTIMIZATION

FIELD OF THE INVENTION

Aspects of the invention relate generally to evolutionary algorithms and other genetic resources, and more particularly to systems and methods for auto-adaptive control over converged results for multi-dimensional optimization.

BACKGROUND OF THE INVENTION

Current evolutionary algorithms or other genetic resources may incorporate epsilon non-dominance to determine a set of solutions that satisfies one or more criteria important to the decision maker. One such criterion is a desired quantity of solutions obtained in the converged result. Another might be a minimum spacing between solutions in the objective vector space for the converged result. In general, a static epsilon vector will typically not allow for the satisfaction of any a priori criterion without intensive hand-tuning and trial and error. The hand-tuning process of the epsilon vector is inefficient, time consuming, and subject to user error. Accordingly, there is an opportunity for systems and methods for auto-adaptive control over converged results for multi-dimensional optimization.

SUMMARY OF THE INVENTION

According to an example embodiment of the invention, there is a method. The method may include identifying an input population of parent epsilon chromosome data structures, where each parent epsilon chromosome data structure provides genes each having a respective candidate epsilon value, each candidate epsilon value representing a respective step size or spacing associated with a respective problem objective of a plurality of problem objectives; selecting one or more pairs of parent epsilon chromosome data structures from the input population of parent epsilon chromosome data structures; combining genes of each selected pair of parent epsilon chromosome data structures according to at least one evolutionary operator to generate a plurality of child epsilon chromosome data structures, each child epsilon chromosome data structure providing one or more genes each having a respective candidate epsilon value representing a respective step size or spacing for the respective problem objective; and evaluating each of the plurality of child epsilon chromosome data structures according to one or more epsilon objective functions to generate respective epsilon objective function values for each child epsilon chromosome data structure, where each epsilon objective function is associated with a respective goal associated with at least one a priori criterion defined using at least a respective subset of the plurality of problem objectives, where each respective epsilon objective function value indicates an extent to which each respective goal can be achieved. One or more of the prior steps may be performed by one or more computers.

According to another example embodiment, there is a system. The system may include at least one memory that stores computer-executable instructions, and at least one processor configured to access the at least one memory. At least one processor may be configured to execute the computer-executable instructions to: identify an input population of parent epsilon chromosome data structures, where each parent epsilon chromosome data structure provides genes each having a respective candidate epsilon value, each candidate epsilon value representing a respective step size or spacing associated with a respective problem objective of a plurality of problem objectives; select one or more pairs of parent epsilon chromosome data structures from the input population of parent epsilon chromosome data structures; combine genes of each selected pair of parent epsilon chromosome data structures according to at least one evolutionary operator to generate a plurality of child epsilon chromosome data structures, each child epsilon chromosome data structure providing one or more genes each having a respective candidate epsilon value representing a respective step size or spacing for the respective problem objective; and evaluate each of the plurality of child epsilon chromosome data structures according to one or more epsilon objective functions to generate respective epsilon objective function values for each child epsilon chromosome data structure, where each epsilon objective function is associated with a respective goal associated with at least one a priori criterion defined using at least a respective subset of the plurality of problem objectives, where each respective epsilon objective function value indicates an extent to which each respective goal can be achieved.

BRIEF DESCRIPTION OF THE DRAWINGS

Reference will now be made to the accompanying drawings, which are not necessarily drawn to scale, and wherein.

DETAILED DESCRIPTION

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention may provide systems and methods for auto-adaptive control over converged results for multi-dimensional optimization. In an example embodiment of the invention, one or more epsilon optimization processes may be disclosed. An epsilon optimization process may be a process independent of an overall problem optimization process. The epsilon optimization process may generate an epsilon vector comprising epsilon values for use in the overall optimization process, and in particular, in the epsilon non-domination sorting of the overall optimization process.

It will be appreciated that the epsilon vector generated by the epsilon optimization process may benefit a decision maker insofar as the decision maker does not need to know in advance what the optimal epsilon vector should be. Indeed, if the epsilon vector is too coarse, only a very sparse approximation of the Pareto-set may be found (and little to no knowledge of the tradeoffs may be ascertained). On the other hand, if the epsilon vector is too fine, an archive of non-dominated solutions may grow too rapidly, thereby significantly slowing the overall problem optimization search. Many other features of the example epsilon optimization process are available without departing from example embodiments of the invention.

I. Core Management System

Figure 1A:
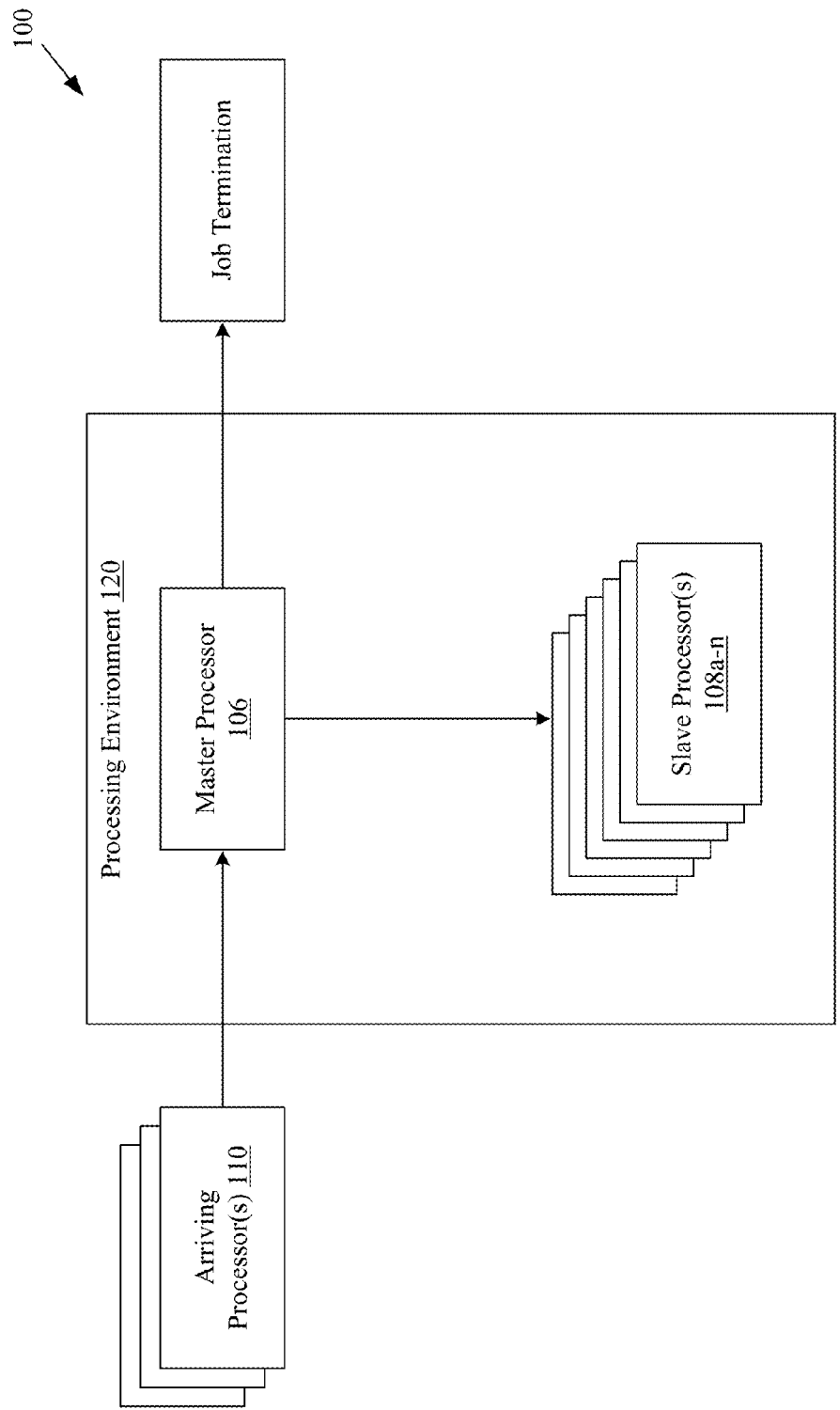
FIG. 1A illustrates an example core management system that supports parallel processing utilized for one or more evolutionary algorithms associated with restricted search in multi-objective optimization, as described herein, according to an example embodiment of the invention.

FIG. 1A illustrates an example core management system 100, according to an example embodiment of the invention. The example core management system 100 may support parallel processing for one or more evolutionary algorithms associated with multi-dimensional (e.g., multi-objective) optimization as well as auto-adaptive control over converged results for multi-dimensional optimization, according to an example embodiment of the invention. The multi-dimensional optimization can support searches for solutions in restricted search/trade-off spaces or in a full search/trade-off space, according to an example embodiment of the invention.

As shown in FIG. 1A, there may be a processing environment 120 in which processing associated with one or more evolutionary algorithms may be managed and performed. The processing environment 120 may include one or more master processor computers 106 (also referred to as "master processors"), and slave processor computers 108a-n (also referred to as "slave processors"). However, it will be appreciated that one or more master processors and slave processors can be demoted or promoted to be respective slave processors or master processors as needed or desired, according to an example embodiment of the invention.

The master processor 106 may be operative to dynamically configure and reconfigure the processing environment 120. In general, the master processor 106 may make a dynamic determination of how many slave processors 108a-n are needed for a job, as well as when job termination criteria have been satisfied, as will be discussed in further detail herein. As described herein, a job may be performed in multiple connected runs prior to termination, where each run may be associated with a particular iteration or operation of an evolutionary algorithm or process, according to an example embodiment of the invention.

During the initial set-up or configuration of the processing environment 120, the master processor 106 may identify a number of available arriving processor(s) 110 having processing capacity. These arriving processor(s) 110 may be available for utilization, perhaps as a result of another application processing being completed. The master processor 106 may also configure and assign one or more of the arriving processor(s) 110 as the respective one or more slave processors 108a-n of the master processor 106. The slave processors 108a-n may likewise carry out one or more operations as instructed by the master processor 106.

Subsequent to the initial set-up or configuration, the master processor 106 may also be operative to dynamically reconfigure the processing environment 120. As an example of such reconfiguration, additional arriving processor(s) 110 may be identified by the master processor 106 as being available while the processing environment 120 is in operation. Accordingly, the master processor 106 may assign roles to the additional arriving processor(s) 110 as needed. For example, one or more slave processor(s) 108a-n in the processing environment 120 may become exhausted (e.g., allocated processing time has been reached), and may need to be removed from the processing environment 120. The departing slave processor(s) 108a-n may have experienced a processing failure or may have otherwise been requested by a higher priority application.

As introduced above, the master processor 106 may determine the number of slave processor(s) 108a-n needed, according to an example embodiment of the invention. In an example embodiment of the invention, a goal of a master processor 106 may be to keep the associated slave processors 108a-n fed or supplied with work as efficiently as possible. When a slave processor 108a-n requests work from the master processor 106 (e.g., sends a packet with results from evaluating the previously received chromosome data structure), the master processor 106 is most efficient in responding to the slave processor 108a-n when it is waiting for the packet (e.g., the master processor 106 is not busy doing other things).

It will be appreciated that the processing environment 120 described herein may accommodate various numbers of processors without departing from example embodiments of the invention.

Figure 1B:
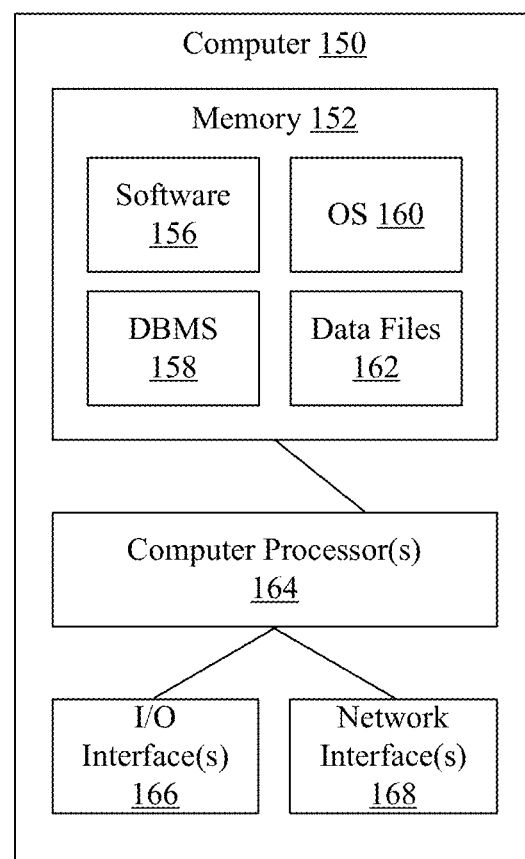
FIG. 1B illustrates an example computer for implementing one or more of the processors in FIG. 1A, according to an example embodiment of the invention.

The processors described in FIG. 1A, including the master processor 106, the slave processors(s) 108a-n, and the arriving processor(s) 110, may be implemented using computers substantially similar to computer 150, or a variation thereof, illustrated in FIG. 1B. The computer 150 may be any processor-driven device, such as, but not limited to, a personal computer, a laptop computer, a server computer, a cluster computer, a specialized computer, and the like. In addition to having one or more computer processor(s) 164, the computer 150 may further include at least one memory 152, input/output ("I/O") interface(s) 166, and network interface(s) 168. The memory 152 may be any computer-readable medium, coupled to the computer processor(s) 164, such as random access memory (RAM), read-only memory (ROM), and/or a removable storage device for storing data files 162 and a database management system ("DBMS") 158 to facilitate management of data files 162 and other data stored in the memory 152 and/or stored in separate databases. The memory 152 may also store various program modules, such as an operating system ("OS") 160 and software 156. The software 156 may comprise one or more software programs for managing, configuring, or performing one or more operations of an evolutionary algorithm, according to an example embodiment of the invention.

The I/O interface(s) 166 may facilitate communication between the computer processor(s) 164 and various I/O devices, such as a keyboard, mouse, printer, microphone, speaker, monitor, bar code readers/scanners, RFID readers, and the like. Likewise, the network interface(s) 168 described herein may take any of a number of forms, such as a network interface card, a modem, a wireless network card, and the like.

Numerous other operating environments, system architectures, and device configurations are possible, beyond those illustrated in FIGS. 1A and 1B. Other system embodiments can include fewer or greater numbers of components and may incorporate some or all of the functionality described with respect to FIGS. 1A and 1B. Accordingly, embodiments of the invention should not be construed as being limited to any particular operating environment, system architecture, or device configuration.

II. Parallel Processing Optimization

A. System Overview

Figure 2:
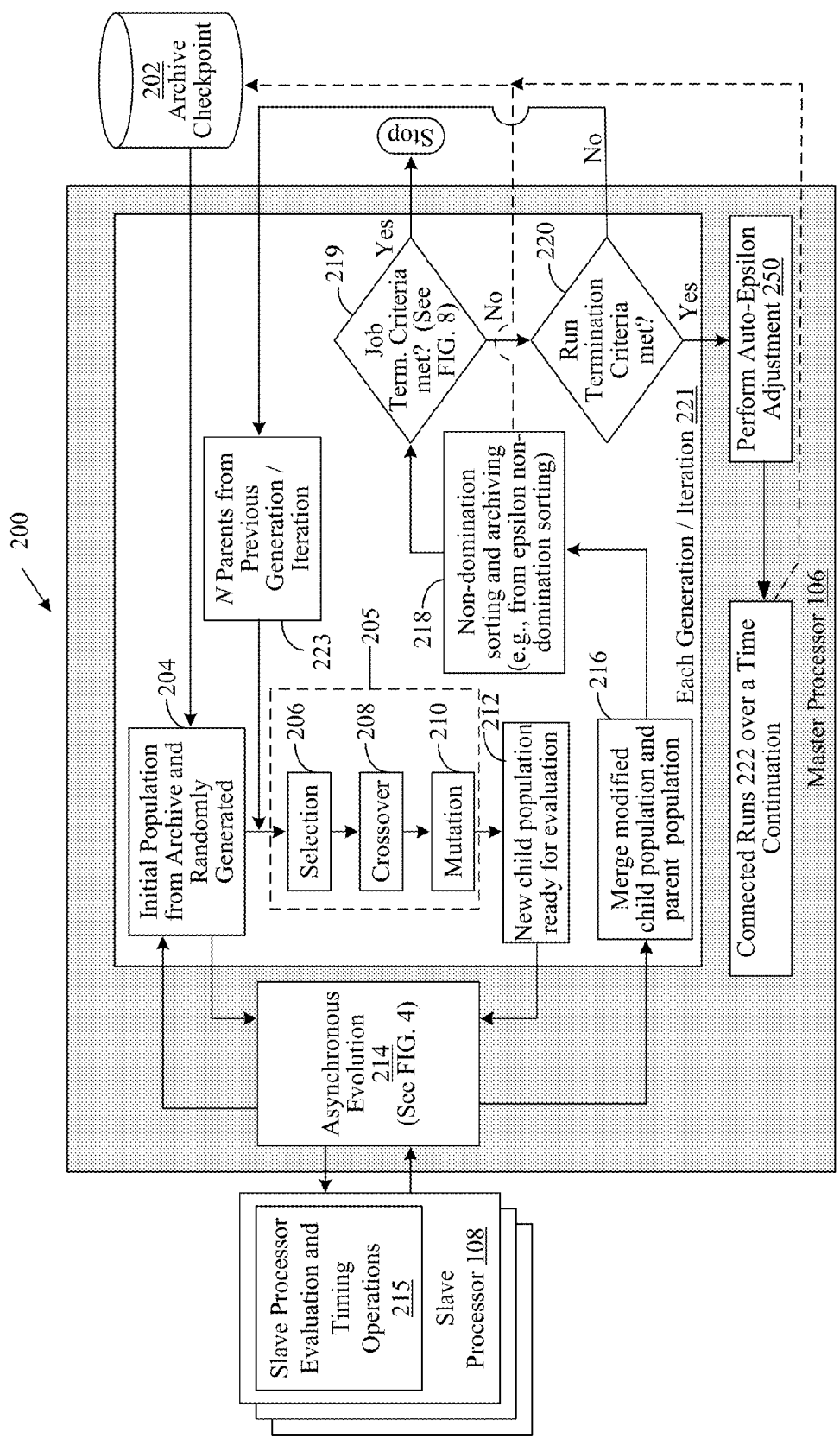
FIG. 2 illustrates an example parallel processing system that executes an evolutionary algorithm supporting multi-dimensional (e.g., multi-objective) optimization as well as auto-adaptive control over converged results for multi-dimensional optimization, according to an example embodiment of the invention.

FIG. 2 illustrates an example parallel processing system 200 that executes an evolutionary algorithm supporting multi-dimensional (e.g., multi-objective) optimization as well as auto-adaptive control over converged results for multi-dimensional optimization, according to an example embodiment of the invention. As shown in FIG. 2, a first portion of the evolutionary algorithm may be performed by a master processor 106 while a second portion of the evolutionary algorithm may be performed by one or more slave processors 108, as discussed herein. However, in an alternative embodiment, all of the processing of the evolutionary algorithm could be performed within a single computer without departing from example embodiments of the invention.

In an example embodiment of the invention, an executed job of the evolutionary algorithm may comprise a plurality of connected runs 222 that occur in a sequence to form a time continuation. Each run 222 may comprise one or more evolutionary operations performed during one or more generations/iterations 221. It will be appreciated that a run may be connected to a prior run in that at least some of the same parents (e.g., parent chromosome data structures) are shared in the "initial population" utilized for initiating respective runs, according to an example embodiment of the invention.

According to an example embodiment of the invention, certain references may be made herein with respect to a plurality of declared sub-dimensional subsets. In general, the declared subsets collectively define a restricted search space for an unbiased optimization involving a plurality of variables and a plurality of problem objectives, where each problem objective may involve one or more of the plurality of variables, according to an example embodiment of the invention. This restricted search space is restricted because it is only a portion of a total search space associated with a plurality of problem objectives. Stated differently, a plurality of problem objectives define a total search space that involves a total number of sub-dimensional subsets, where each sub-dimensional subset involves relationships between or among two or more respective problem objectives. The "declared" subsets described herein represent only a portion of the total number of sub-dimensional subsets. As such, the declared subsets define only a restricted search space that is only a portion of the total search space, according to an example embodiment of the invention. In a simplest embodiment, there may only be one subset for an entire search space. In this case, the one subset may include all of the variables and problem objectives, according to an example embodiment of the invention.

Example processing by an executed job of the evolutionary algorithm will now be discussed in further detail with respect to FIG. 2. Referring now to block 204, the master processor 106 may receive or obtain an initial population of parent chromosome data structures. In an example embodiment of the invention, each parent chromosome data structure may include the chromosome, where the chromosome may include one or more parameters (which may also be referred to as "genes"), which may include:

Static (Fixed Value/Constant) Variables: Once assigned, the values of the static variables remain constant and are not changed by any evolutionary operations of an evolutionary algorithm;

Evolved Variables: The values of the evolved variables may be changed by one or more evolutionary operations of an evolutionary algorithm; and Derived Variables: The values of the derived variables are derived based upon a combination of one or more static variables, evolved variables, and other derived variables in accordance with one or more functions.

Still referring to block 204, the initial population of parent chromosome data structures may be obtained by one or more sources. In an example embodiment of the invention, the initial population of parent chromosome data structures may be obtained from a combination of the archive checkpoint 202 and random generation of new chromosome data structures. For example, 25% of the initial population of parent chromosome data structures may be obtained from the archive checkpoint 202 while 75% of the initial population may be randomly generated. The chromosome data structures obtained from the archive checkpoint 202 may have previously been evaluated in accordance with the problem objective functions. On the other hand, the randomly generated chromosome data structures may not have been evaluated in accordance with the problem objective functions, and thus, they may be delivered to block 214, which allocates the chromosomes to the slave processors 108 for problem objective function evaluation by block 215.

The archive checkpoint 202 may include an elite set of chromosome data structures (i.e., elite solutions) obtained from one or more prior generations/iterations 221, according to an example embodiment of the invention. These chromosome data structures in the archive checkpoint 202 may be non-dominated according to the problem objectives. The archive checkpoint 202 may take the form of a data file or database stored in a computer memory, computer disk, network storage, or other non-volatile memory. As the archived chromosome data structures were previously evaluated in a prior generation/iteration 221, these chromosome data structures may be associated with a plurality of problem objective function values corresponding to a respective plurality of problem objective functions. Each problem objective function may be associated with any predefined objective to be optimized by the executed job of the evolutionary algorithm. For example, in a satellite constellation coverage optimization, a problem objective function may be associated with the problem objective of maximizing global coverage, and a corresponding problem objective function value may indicate which chromosome data structure (based upon the included chromosome and its respective genes) is able to achieve the greatest amount of global coverage.

Alternatively, in block 204, the initial population of parent chromosome data structures may be produced from only randomly generated chromosome data structures. In generating the random chromosome data structures, the values for the evolved and/or static variables (e.g., fixed values/constants) in the one or more chromosomes may be selected to be within specified allowable ranges or limits. Values for the derived variables can be calculated from one or more evolved variables, static variables, and/or other derived variables in accordance with one or more specified functions. The randomly generated parent chromosome data structures may then be delivered to block 214, which allocates the chromosomes to the slave processors 108 for problem objective function evaluation by block 215. Once the problem objective function evaluations in block 215 have been completed, and the problem objective function values have been received in block 214, then each of the randomly generated parent chromosome data structures may be associated with a respective plurality of problem objective function values.

It will be appreciated that each member of the population of chromosome data structures may have an associated rank array equal and/or diversity array equal in dimension to the total number of declared subsets for optimization over the subspace. The rank array and/or diversity array may have been previously filled, in accordance with block 218 discussed herein, for each chromosome data structure by computing its domination rank for each subset. This rank array and/or diversity array may be utilized as part of the selection process in block 206.

Figure 3A:
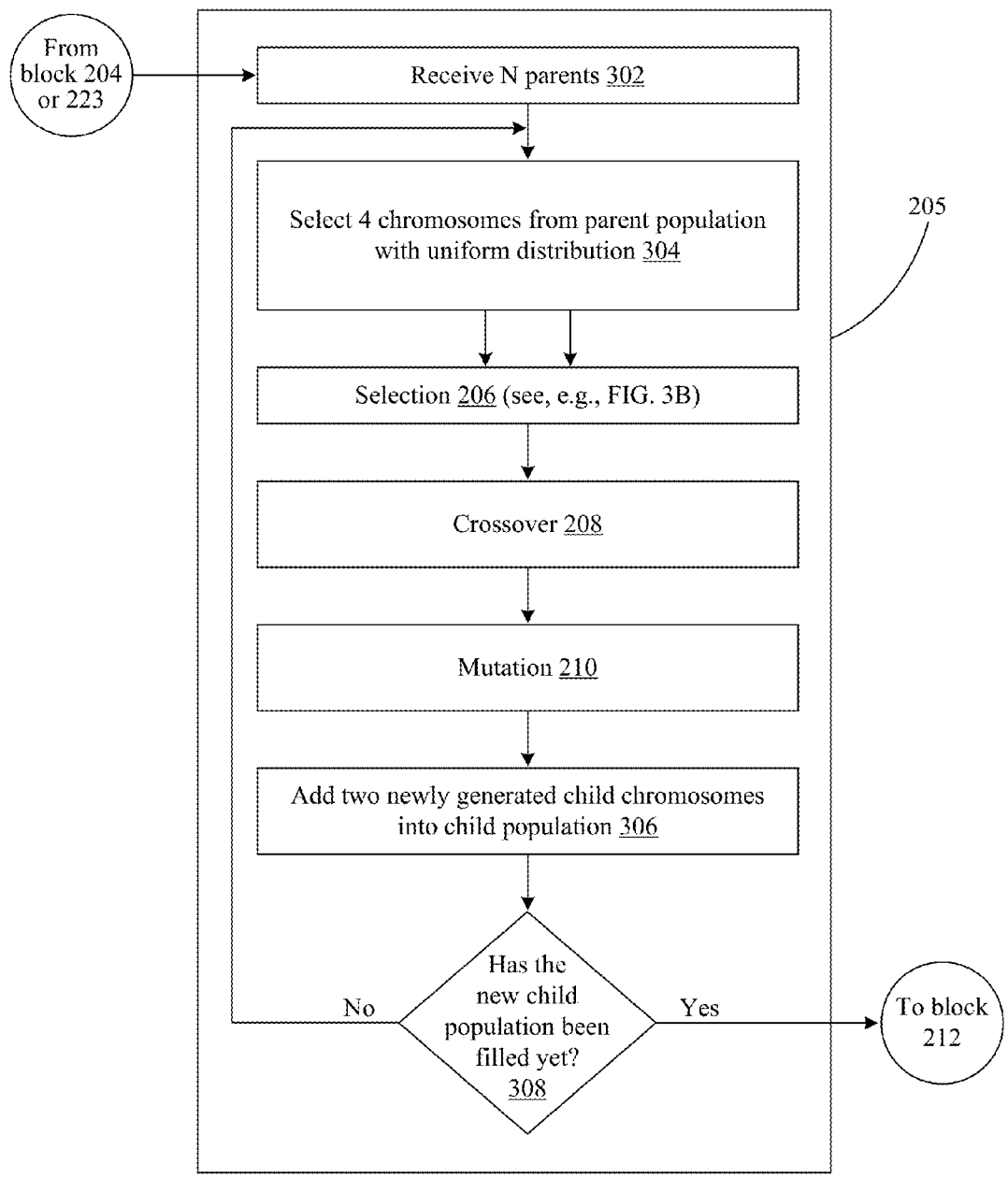
FIG. 3A illustrates an example process for generating a child population of chromosome data structures, according to an example embodiment of the invention.

Accordingly, having received or obtained the initial population of parent chromosome data structures in block 204 (or block 223), processing may then proceed to block 205 for generation of a child population of chromosome data structures based upon these parent chromosome data structures. FIG. 3A illustrates an example process for implementing block 205, according to an example embodiment of the invention. Turning now to FIG. 3A, at block 302, the initial population of N parent chromosome data structures may be received or obtained from block 204 or block 223. In particular, the population of N parent chromosome data structures may be obtained or retrieved from a previous generation/iteration (block 223) and/or from block 204 via an archive checkpoint (block 202).

Following block 302 is block 304, where two pairs of chromosome data structures (i.e., a total of four chromosome data structures grouped as two pairs) may be selected from the parent population. In an example embodiment of the invention, two pairs of chromosome data structures may be selected, perhaps with equal probability based upon a uniform distribution of the input population. As such, it may be possible that a particular parent chromosome data structure may be present in two or more selected pairs of parent chromosome data structures, according to an example embodiment of the invention. Each pair of chromosome data structures may be provided to the selection process in block 206.

Still referring to FIG. 3A, in block 206, the master processor 106 may receive a pair of parent chromosome data structures from block 304. The received pair of chromosome data structures may be subject to a crowded tournament selection process involving a plurality of declared sub-dimensional subsets, where the plurality of declared sub-dimensional subsets collectively define the restricted searchable space for an optimization involving a plurality of variables. In particular, when initiating a job, a user may have defined or declared the sub-dimensional subsets of interest. In an alternative embodiment, there may only be one subset corresponding to a total searchable space for an optimization involving a plurality of variables. This alternative embodiment may be representative of a special case situation in which a subset actually includes all of the problem objectives.

Figure 3B:
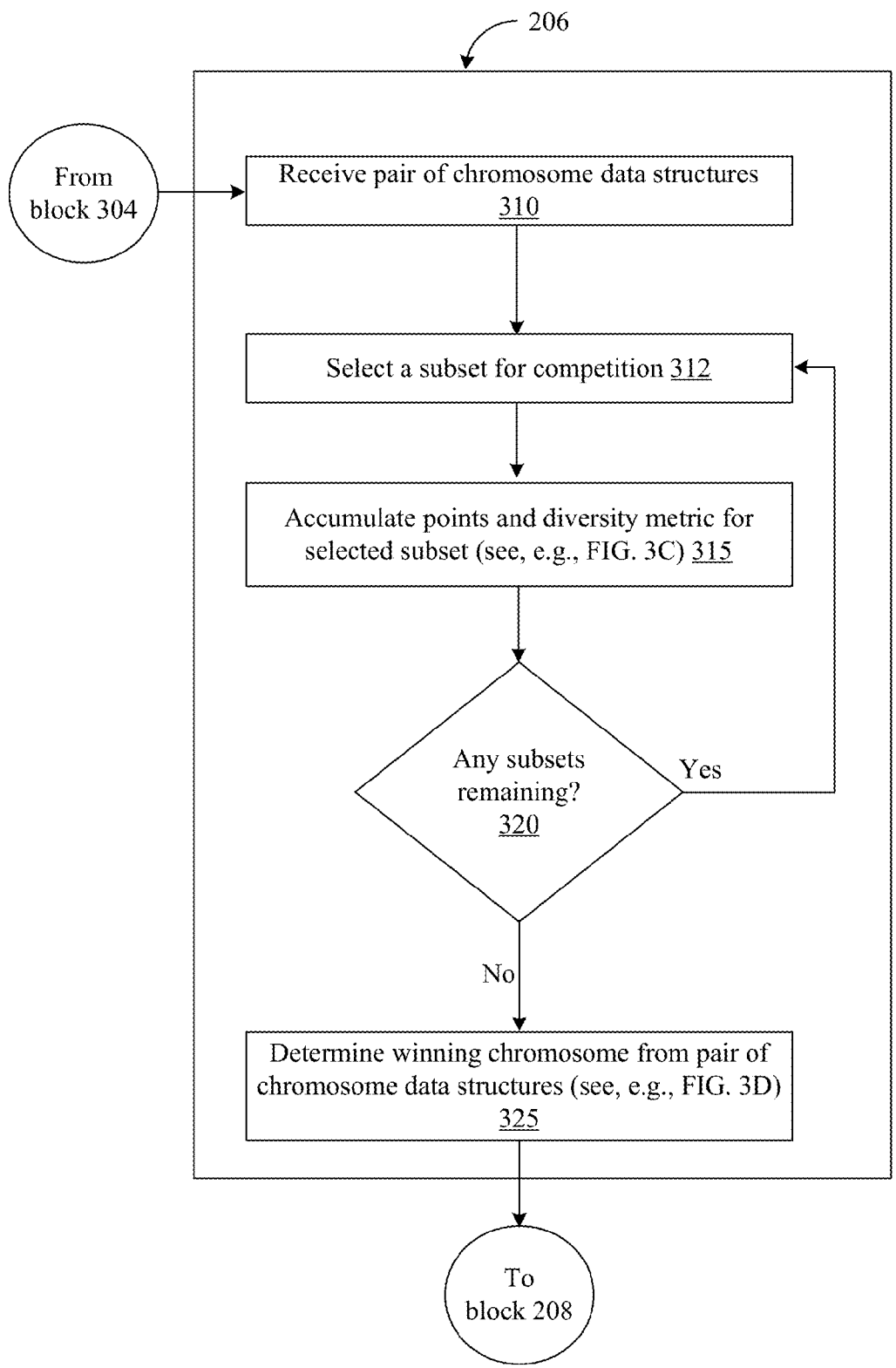
FIGS. 3B-3D illustrate an example selection process, according to an example embodiment of the invention.
Figure 3C:
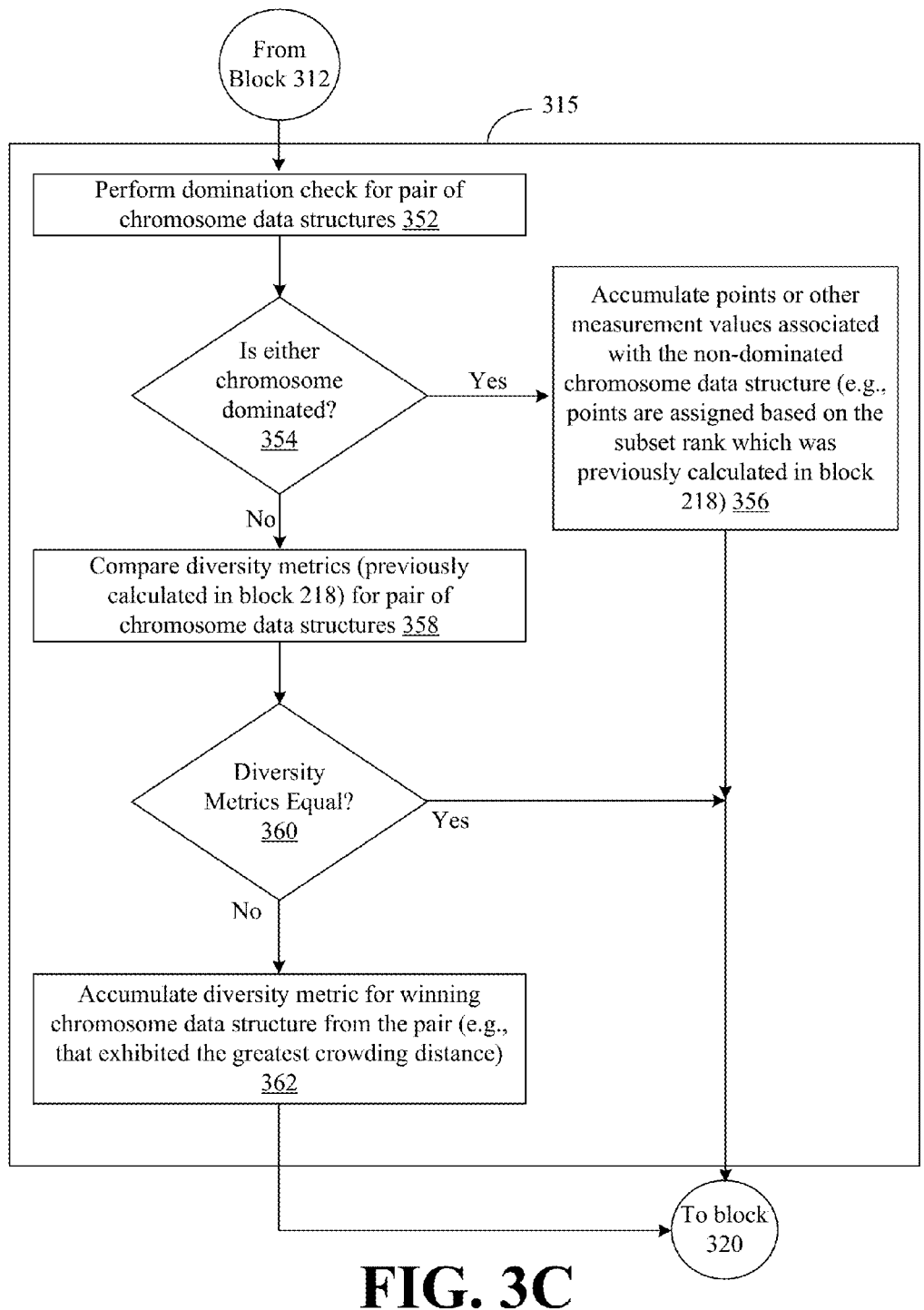
Figure 3D:
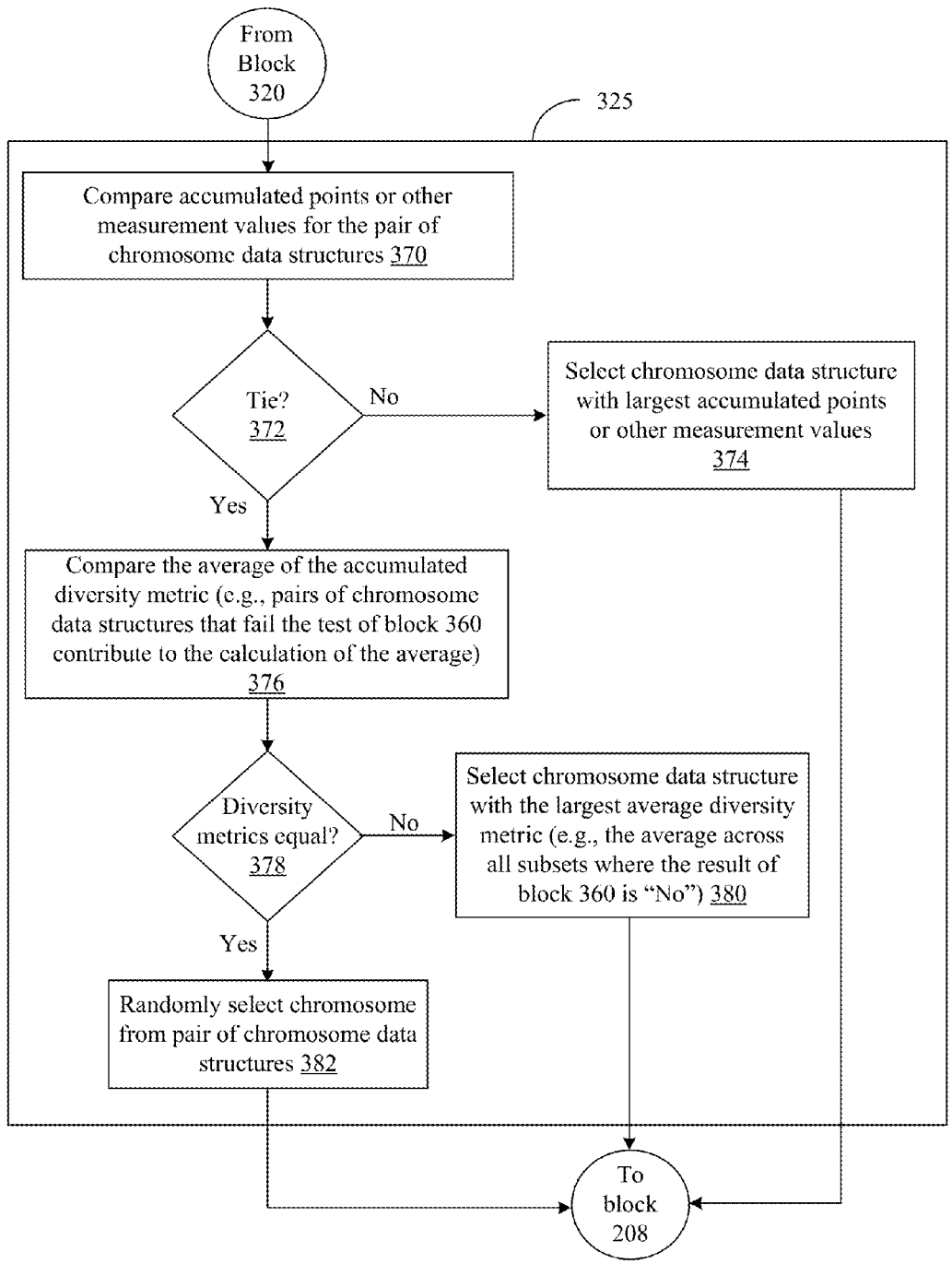

As will be illustrated in more detail with respect to FIGS. 3B-3D, in block 206, pairs of parent chromosome data structures may compete in a tournament selection process for each declared subset from the plurality of declared sub-dimensional subsets. In general, the tournament selection process may determine, via a domination check, whether a chromosome data structure dominates another chromosome data structure within a respective subset defining a restricted search space. However, simply counting the number of subset non-domination instances (e.g., the number of times a chromosome data structure is non-dominated or "wins") may result in the selection of an inferior solution (e.g., chromosome data structure A could be rank 1 in the first subset, rank 30 in the second subset, and rank 25 in the third subset, and not be selected over chromosome B that is rank 15 in the first subset, rank 15 in the second subset, and rank 15 in the third subset, where rank "1" represents a non-dominated (superior) solution while higher-numbered ranks represent increasingly dominated (and inferior) solutions within a population). Accordingly, in addition or in the alternative, points or other units of measure may be accumulated for a chromosome data structure for each subset that it dominates in. For example, if a chromosome data structure dominates a particular subset, it may accumulate points based upon its subset domination ranking obtained from its associated rank array. Thus, accumulation of points or other units of measurement may be used to balance elite chromosome selection while allowing potentially, but not vastly inferior, chromosome data structures to participate. Upon completion of the tournament selection process for the subsets, the overall winning chromosome data structure can be determined based at least in part by comparing the accumulated points or other units of measure for each chromosome data structure of the pair. The overall winning chromosome data structures of each tournament become the two parents resulting from the selection process of block 206.

Following block 206, the chromosomes in selected pairs of parent chromosome data structures may be subject to one or more evolutionary operators to generate a plurality of child chromosome data structures, according to an example embodiment of the invention. Two example evolutionary operators are illustrated by blocks 208 and 210. For example, block 208 illustrates a crossover evolutionary operator in which a portion of the parameter values or "gene" values may be exchanged between chromosomes in selected pairs of parent chromosome data structures to generate new pairs of chromosome data structures. In an example embodiment of the invention, the crossover evolutionary operator may be capable of performing crossover using integer or non-integer numbers (e.g., double precision numbers, etc.), binary representation of numbers, letters, and/or symbols. As another example, block 210 illustrates a mutation evolutionary operator in which a parameter value or gene value (e.g., an evolved variable value) in a chromosome of a chromosome data structure may be varied or otherwise changed to another value by a mutation.

It will be appreciated that the crossover evolutionary operator and the mutation evolutionary operator need not necessarily be applied to genes of each received chromosome in the chromosome data structure. In an example embodiment of the invention, only a portion or percentage of the received chromosomes in the chromosome data structures in blocks 208 and 210 may have their genes crossed-over or mutated, respectively. The respective portions or percentages that are crossed-over and/or mutated may be predetermined or dynamically varied during operation of the evolutionary algorithm, according to an example embodiment of the invention. For example, a first predetermined portion or percentage (e.g., 50%-80%) of the received chromosomes of the chromosome data structures may have genes that are crossed over in block 208 while a second predetermined portion or percentage (e.g., 1%-3%) of the received chromosomes of the chromosome data structures may have genes that are mutated in block 210. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 208 and 210 may be available without departing from example embodiments of the invention. Likewise blocks 208 and 210 may be performed in a different order than that shown in FIG. 2 or otherwise combined into a single block without departing from example embodiments of the invention.

Still referring to FIG. 3A, at block 306, the two newly generated chromosome data structures (based upon two pairs of chromosome data structures being processed via blocks 206, 208, 210) are added to the child population. Following block 306, processing may proceed to block 308 to determine whether enough child chromosome data structures have been produced for the child population (e.g., based upon one or more thresholds). If not enough chromosome data structures have been produced to fill the new child population, then processing may return to block 304 discussed above, and following the subsequent processing, additional chromosome data structures may be added to the child population in block 306. On the other hand, if block 306 determines that enough chromosome data structures have been produced to fill the child population, then processing may proceed to block 212 of FIG. 2. It will be appreciated that the size of the child population may be fixed, or may be varied if desirable, from connected run to connected run, according to an example embodiment of the invention.

Returning back to FIG. 2, a new population of child chromosome data structures may be obtained in block 212. Following block 212, processing may proceed to block 214. In block 214, the new population of child chromosome data structures may be received into a "To Evaluate" list or queue (see also FIG. 4, which illustrates an example implementation of block 214 in further detail). Block 214 may then allocate the chromosome data structures from the "To Evaluate" list or queue to the plurality of slave processors 108 according to an asynchronous evolution process.

In block 215, each slave processor 108 may have received a chromosome bundle comprising one or more chromosome data structures from the master processor 106. The slave processors 108 may be homogenous or heterogeneous in processing capability. Each slave processor 108 may evaluate, in accordance with a plurality of problem objective functions, the received chromosome data structures to generate a plurality of respective problem objective function values for each chromosome data structure in block 215. In addition, each slave processor 108 may also perform timing operations or calculations, including determination of certain wait times and/or evaluation times associated with the respective slave processor 108, in block 215. As each slave processor 108 finishes the problem objective function evaluations and/or timing operations in block 215, the slave processor 108 may provide the evaluation results (e.g., problem objective function values) and timing data (e.g., wait times and/or problem objective function evaluation times) to the master processor 106. The master processor 106 may provide the received problem objective function values as well as an identification of the corresponding evaluated child chromosome data structures to a "Finished" list or queue. It will be appreciated that with asynchronous evolution processing, the problem objective function results may be included in the "Finished" list or queue on an as-received basis from the slave processor 108. Indeed, the evolutionary process is asynchronous in that as soon as the "To Evaluate" list is empty for a given generation/iteration 221, the processing taking place in block 214 is completed, where the child population passed to block 216 is comprised of all of the chromosome data structures currently within the "Finished" list. It will be further appreciated that the results from some of the chromosome bundles previously sent to the various slave processors 108 may not have been received at the time the "To Evaluate" list is emptied. These may be referred to as late chromosome data structures from one or more prior generations/iterations.

In block 216, the master processor 106 receives a modified child population of chromosome data structures from the asynchronous evolution process of block 214. The modified child population may include different chromosome structures as well as a different number of chromosome data structures as compared to the child population of block 212. The received modified child population is merged with the current parent population, as illustrated by block 216.

Figure 5A:
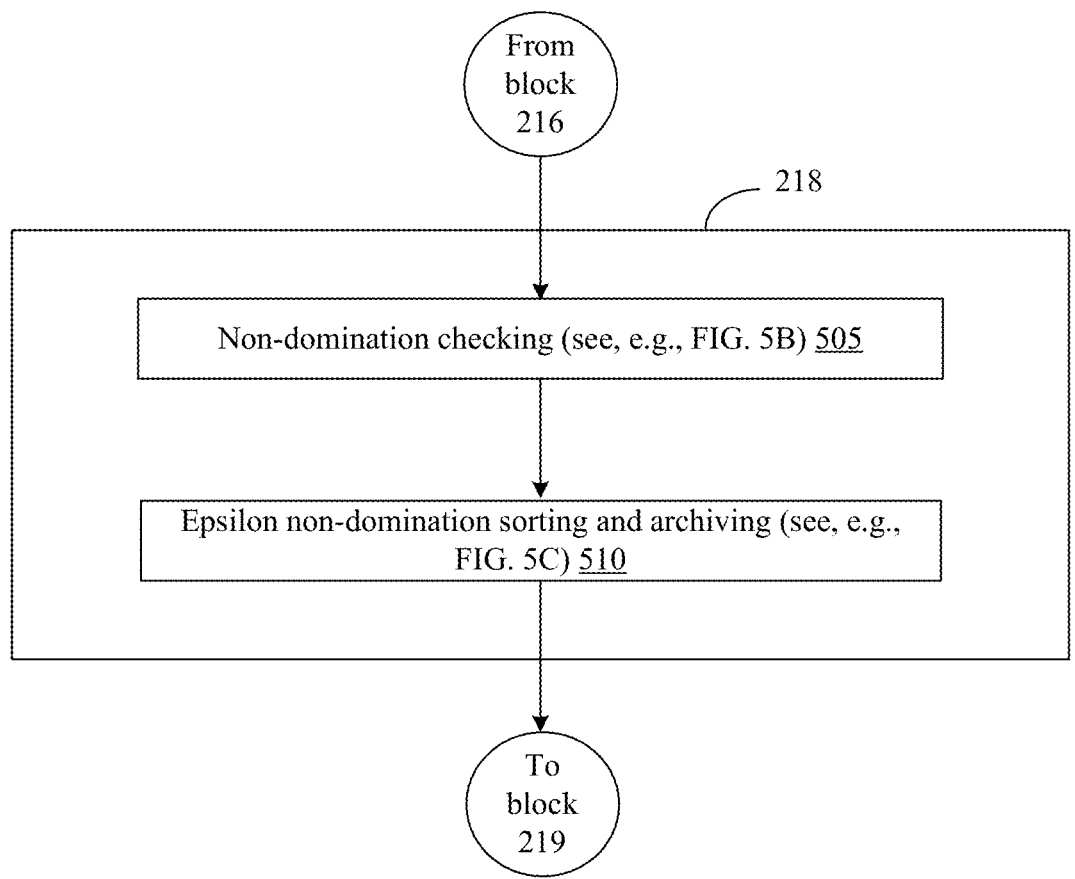
FIGS. 5A-5C illustrate example non-domination sorting and epsilon non-domination sorting and archiving in accordance with an example embodiment of the invention.
Figure 5B:
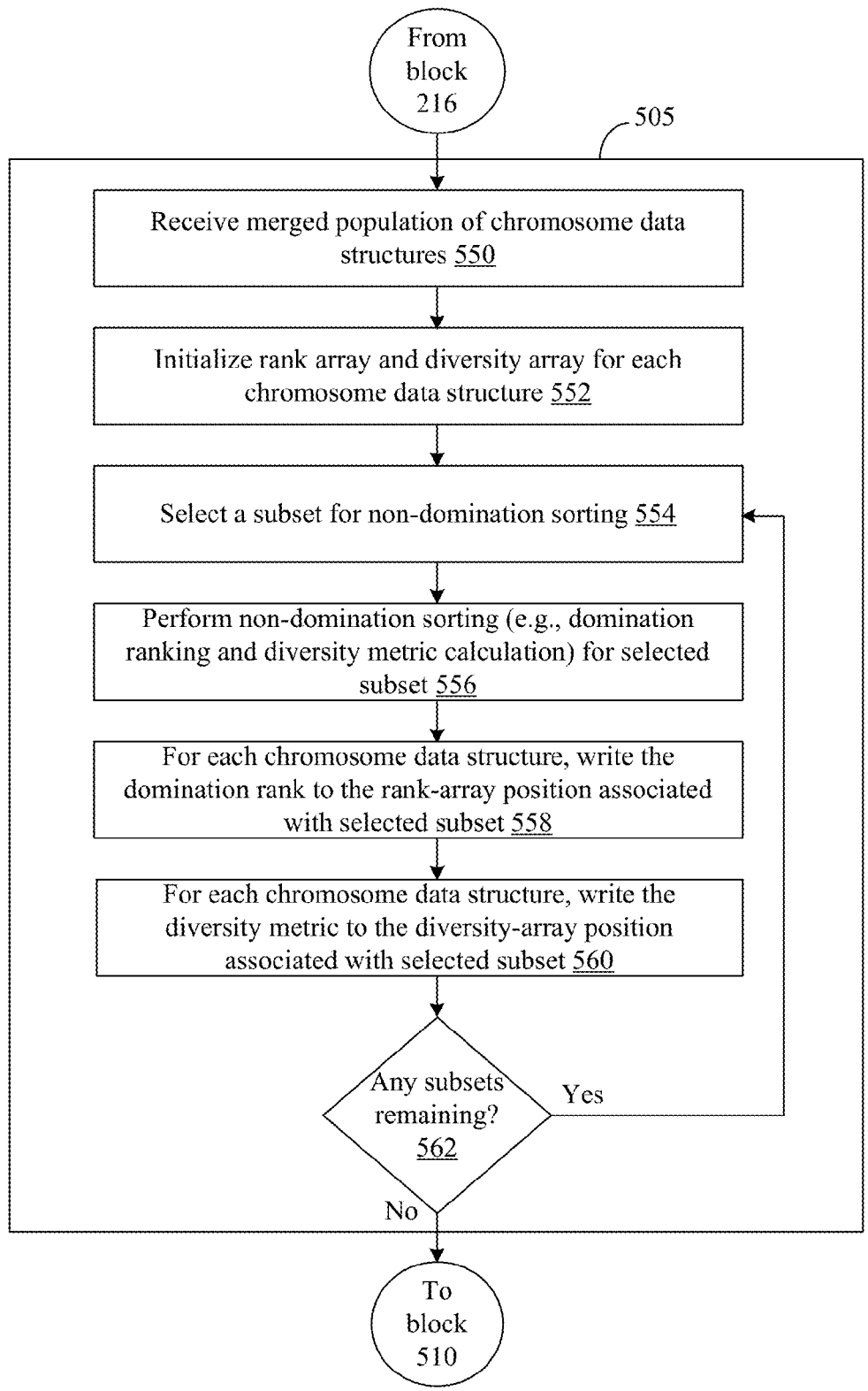
Figure 5C:
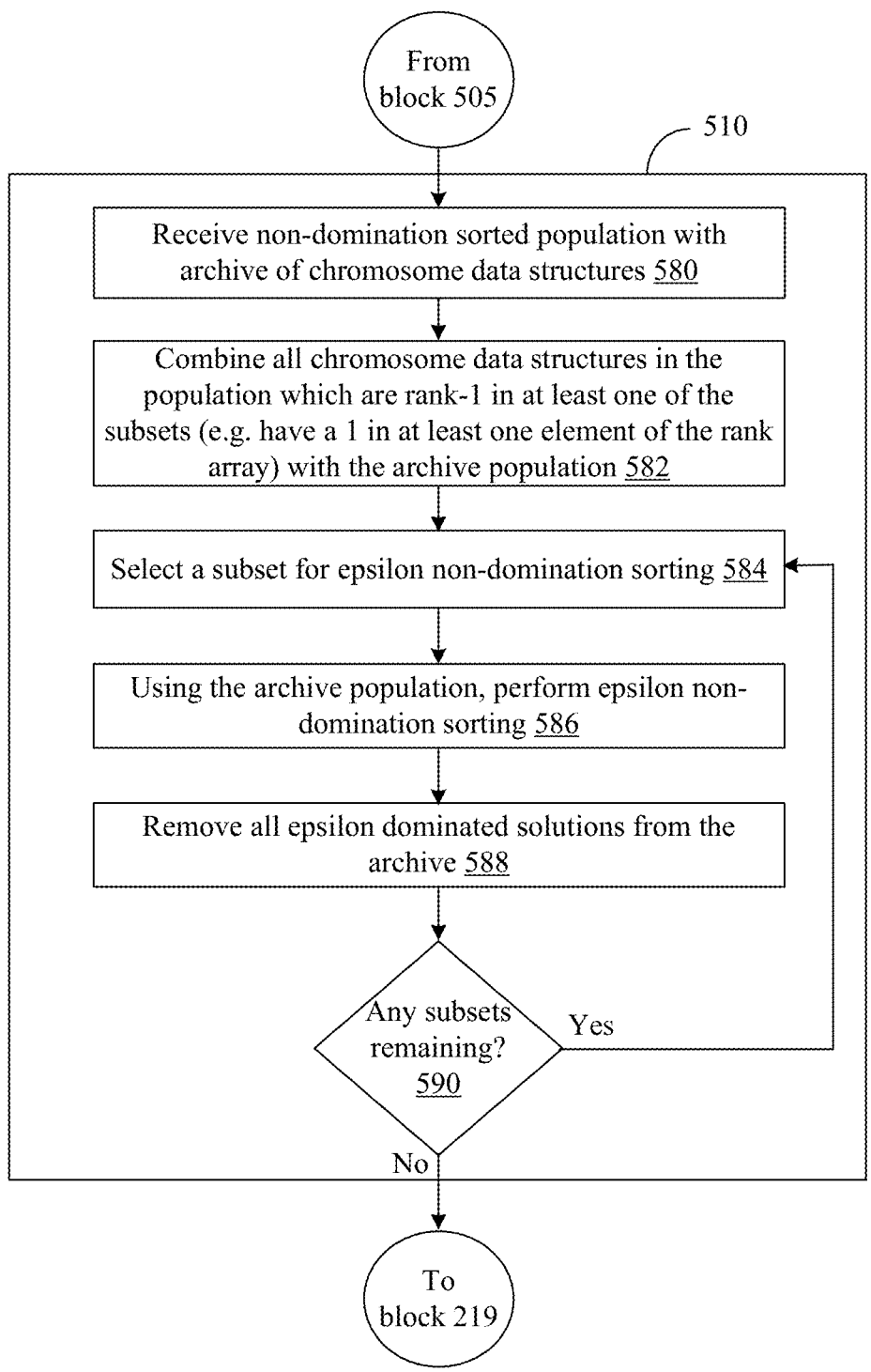

In block 218, the master processor 106 may perform a first non-domination sorting, and a second epsilon non-domination sorting and archiving, as described in further detail with respect to FIGS. 5A-5C. In general, non-domination sorting may be performed (e.g., domination ranking and diversity metric calculation) for each subset of the plurality of declared sub-dimensional subsets. More specifically, for each subset, the master processor 106 may perform non-domination sorting, on a subset-by-subset basis, of the merged list of child and parent chromosome data structures to provide each chromosome data structure with a rank array equal in dimension to the total number of subsets defined for optimization over the subspace. Accordingly, following the non-domination sorting, each chromosome data structure may have an associated rank array indicating the respective domination rank for each subset. Likewise, diversity metrics may likewise be determined for each chromosome data structure to provide a diversity array indicating the respective diversity metric for each subset. Following non-domination sorting, block 218 may also perform epsilon non-domination sorting and archiving. In general, those chromosome data structures that survive subset-based epsilon non-domination sorting, and that are epsilon non-dominated in at least one subset, may be passed to the archive and may represent the set of elite solutions for a particular generation.

Following processing in block 218, processing may proceed to block 219. In block 219, a determination is made as to whether the current job is completed such that the evolutionary algorithm should be terminated. A job typically comprises processing involving a plurality of connected runs 222, where each run 222 may include processing associated with one or more generations/iterations 221. Block 219 may include, but is not limited to, termination based upon whether the search has failed to produce sufficient improvement in solutions for each declared subset over a predefined number of generations/iterations or whether a maximum number of function evaluations has been completed or a maximum time (e.g., based upon a wall clock time) has elapsed. For example, the evolutionary algorithm may terminate a job according to sufficient improvement termination criteria, if a predetermined percentage (e.g., 90%) of the obtained solutions remain in the same epsilon rectangles, volumes, or hypervolumes/hyperrectangles for each declared subset for a prior number of generations (e.g., the last 20 generations), or alternatively, across a prior number of connected runs, in accordance with an example box fitness termination criteria (see, e.g., FIG. 8). It will be appreciated that the obtained solutions comprising the chromosome data structures may be output in a variety of formats, including a database format, a comma separated value (CSV) format, or a graphical format.

If block 219 determines that the job is not complete, then processing may proceed to block 220 to determine whether the current run 222 has completed. In determining whether the current run is complete, block 220 may determine whether a current run 222 has failed to produce improvement in one or both of the quantity or quality of the solutions generated from the prior iterations/generations 221. The quantity measure may be based upon the number of solutions. The quality measure may be based on some quantification of distance from a utopia point, box fitness (e.g., described with respect to FIGS. 8A-8F), or yet another measure.

If block 220 determines that a current run 222 is not complete, then processing may proceed to block 223, wherein a population of parent chromosome structures may be obtained or otherwise selected from the elite chromosome data structures determined from block 218. The prior process is then repeated for another generation/iteration 221 using the parent chromosome data structures from the prior generation/iteration. It will be appreciated that because the evolution process of block 214 can be asynchronous, there may be one or more late child chromosome data structures received in the "Finished" list or queue in block 216 that are associated with one or more pairs of parent chromosome data structures allocated to slave processors 108 during one or more prior generations/iterations. Indeed, one or more slave processors 108 may have experienced delays, lags, overloads, or problems in processing, thereby resulting in the late child chromosome data structures. Therefore, in the next generation/iteration 221, the merged child chromosome data structures in block 216 may likewise include those late child chromosome data structures as well as current child chromosome data structures from parent chromosome data structures allocated to slave processors 108 during the current generation/iteration 221.

On the other hand, block 220 may determine that a current run 222 is complete. For example, looking back over a pre-determined number of generations, the search may have failed to produce improvement in the solutions during each generation/iteration 221 of the current run 222. Improvement may be based upon the quantity of the solutions (e.g., the number of solutions) and the quality of the solutions (e.g., some quantification of distance from a utopia point, box fitness, etc.). In this case, the current run 222 is completed, and processing may proceed to block 250, where an auto-epsilon adjustment process may be performed. As described in further detail herein, an example auto-epsilon adjustment process may be used to automatically determine an appropriate epsilon vector for use with the epsilon non-domination sorting of block 218 when performing a subsequent run 222. Following block 218, the example process may proceed to initiate a subsequent run 222. The subsequent run 222 may generate an initial population by invigorating the elite solutions stored in the archive checkpoint 202. In particular, the subsequent run 222 may utilize a first number of the elite solutions from the archive checkpoint 202 as part of the initial population utilized in block 204, but may also invigorate the initial population by adding a second number of randomly generated parent chromosome data structures. The randomly generated parent chromosome data structures may be generated and evaluated using the example processes discussed with respect to blocks 204 and 214.

B. Example Selection Process

FIGS. 3B-3D illustrate an example selection process that may be utilized for block 206 of FIG. 3A, according to an example embodiment of the invention. While FIGS. 3B-3D may provide an example implementation for block 206 of FIG. 3A, it will be appreciated that many other variations are available without departing from example embodiments of the invention.

Turning now to FIG. 3B, in block 310, a pair of chromosome data structures may be obtained or retrieved from block 304 of FIG. 3A. Following block 310 is block 312, where a subset is selected from the plurality of declared sub-dimensional subsets. As described herein, a decision maker may have specified or otherwise declared the subsets that were included in the plurality of declared sub-dimensional subsets.

Following block 312 is block 315, where for each chromosome data structure, a unit of measure (e.g., points) and a diversity metric for the selected subset may be accumulated. An example process for block 315 will now be described with respect to FIG. 3C. Turning now to FIG. 3C, at block 352, a domination check is performed for the pair of chromosome data structures. For example, a first solution $x_1$ is said to dominate a second solution $x_2$ for a particular subset if both conditions 1 and 2 identified below are true:

Condition 1: The solution $x_1$ is no worse than $x_2$ in all problem objectives associated with the particular subset.

Condition 2: The solution $x_1$ is strictly better than $x_2$ in at least one problem objective associated with the particular subset.

If both conditions 1 and 2 are satisfied, then all of the following statements are substantially equivalent:

$x_2$ is dominated by $x_1$ for a particular subset, $x_1$ is non-dominated by $x_2$ for a particular subset, or $x_1$ is non-inferior to $x_2$ for a particular subset.

Accordingly, at block 354, the respective problem objective function values for those problem objective functions associated with the selected subset may be used to determine whether either chromosome data structure is dominated by the other solution. If so, then processing may proceed to block 356, where points or other measurement values are accumulated for the non-dominated, winning chromosome data structure. It will be appreciated that the number of points or measurement values accumulated for the non-dominated chromosome data structure may be based upon the subset domination rank that was previously calculated in block 218. Indeed, as discussed in further detail below, the points or measurement scheme may represent a balance between the search and selection pressure that allows an inferior chromosome data structure (relative to the entire population) a chance to "win" and propagate its attributes or genes.

According to an example embodiment of the invention, a chromosome data structure having the highest possible subset domination rank (e.g., a non-dominated solution having a rank of "1") may accumulate the maximum number of available points or measurement values. On the other hand, a chromosome data structure having a less-than-best subset domination rank may accumulate a less-than-maximum number of available points, including zero points. Table I below is an example illustration of a points accumulation scheme for particular domination ranks, according to an example embodiment of the invention. It will be appreciated that different points values may be assigned for different domination ranks without departing from example embodiments of the invention. It will also be appreciated that in some embodiments, the points values could be configured so that winning solutions accumulate lower numbers of points than losing solutions without departing from example embodiments of the invention.

TABLE I

| Domination Rank for a Given Subset | Number of Points Assigned |
|---|---|
| 1 | 10 |
| 2 | 6 |
| 3 | 4 |
| 4 | 2 |
| 5 | 1 |
| 6 | 0.5 |
| >6 | 0 |

In the instance where neither chromosome data structure is dominated by the other in block 354, processing may proceed to block 358. Block 358 may compare the diversity metrics for the two chromosome data structures. Block 360 may then determine whether the diversity metrics for the two chromosome data structures are equal. If the diversity metrics are equal, then no points or diversity metrics may be accumulated for either chromosome data structure, and processing of block 315 may be complete such that processing may proceed to block 320 of FIG. 3B. On the other hand, if the diversity metrics are not equal, then processing may proceed to block 362. At block 362, diversity metrics may be accumulated for the subset winning chromosome data structure that exhibits the greatest measure of diversity. The diversity metrics (e.g., the crowding distance) may be a way to measure how close a given chromosome data structure is to others within a population (e.g., population from block 216). In an example embodiment of the invention, a larger value for the diversity metric may indicate that the given chromosome data structure is further away from others, and is thus, more diverse. Accordingly, a more diverse chromosome data structure may generally be a more desirable result for multi-objective optimization problems. Hence, less diverse chromosome data structures may be eliminated or thinned out. It will be appreciated that each chromosome data structure has a crowding-distance array with crowding distances for each subset. Accordingly, when two competing parent chromosome data structures are non-dominated with respect to each other (block 354) and the diversity metrics are not equal (block 360), then the diversity metrics (e.g., crowding distance) for each parent chromosome data structure are used to determine the winner of the tournament. In an example embodiment of the invention, the actual diversity metric used during the comparison between chromosome data structures in a tournament may be found from the accumulated average of the non-dominated subset crowding distances. Following block 362, processing of block 315 may be complete such that processing may proceed to block 320 of FIG. 3B.

Returning now to FIG. 3B, block 320 may determine whether the chromosome data structure has been evaluated in block 315 with respect to all subsets in the plurality of declared sub-dimensional subsets. If any subsets remain, then processing may return to block 312 where another subset may be selected. On the other hand, if no subsets in the plurality of declared sub-dimensional subsets remain, then processing may proceed to block 325.

In block 325, the winning chromosome data structure from the pair may be determined. An example process for block 325 will now be described with respect to FIG. 3D. In block 370, the respective accumulated points or measurement values for each chromosome data structure may be compared. If the respective accumulated points or measurement values are not equal (block 372), then processing may proceed to block 374, where the chromosome data structure with the largest accumulated points or other measurement values may be selected as the overall winning chromosome data structure, which is then identified for block 208.

On the other hand, the respective accumulated points or other measurement values may be equal (block 372) in which case processing may proceed to block 376. In block 376, the accumulated diversity metrics for each chromosome data structure may be compared. It will be appreciated that the accumulated diversity metrics for each subset may be used to calculate an average diversity metric across the subsets, which may be used for decision block 378. If the diversity metrics are not equal (block 378), then processing may proceed to block 380, where the chromosome data structure with the largest diversity metric (e.g., largest average diversity metric) may be selected as the overall winning chromosome data structure. On the other hand, if the diversity metrics are equal (block 378), then processing may proceed to block 382, where one of the pair of chromosome data structures may be randomly selected as the overall winning chromosome data structure, which is then identified for block 208.

The points or other measurement scheme introduced will now be discussed in further detail. In general, the points or other measurement scheme may be developed to balance the search and selection pressures. Indeed, it is possible that, relative to the entire population, that the two chromosomes undergoing a tournament have different ranks, but when compared to each other, they may both be non-dominated, and the utilized points or other measurement scheme may impact the likelihood that the inferior chromosome (relative to the population) can "win" and pass on its attributes or genes.

As a more particular example, a domination check can be applied to the two chromosomes (chrom-A and chrom-B) competing in the tournament with respect to each other (as opposed to the non-domination sorting of box 218 which is with respect to the entire population). Chrom-A may be in rank-1 and chrom-B may be in rank-2 (relative to the entire population), but when chrom-A and chrom-B are compared against each other in isolation, they may be non-dominated with respect to each other. In this situation, during the non-domination sorting (of box 218), some other chromosome within the population (say chrom-C) must have dominated chrom-B causing it to be demoted to a lower rank. However, in the tournament selection (e.g., block 206), when chrom-A and chrom-B are competing only against each other, chrom-B which is inferior to chrom-A as far as rank is concerned may have a chance to be "elevated" and awarded a "win" based upon accumulated points or other units of measure for each subset. Thus, search pressure can be balanced with selection pressure based upon the configuration of the points or other measurement scheme, allowing for the search to continue into the area represented by chrom-B's attributes or genes.

Illustrative Embodiment

To further illustrate the selection process of block 206, the following example is provided. In this example, we assume that there is an optimization problem involving four problem objectives, where each problem objective may be indexed as follows:
0, minimize cost;
1, maximize design life;
2, maximize performance; and
3, maximize luxury.

With these four problem objectives, there may be a plurality of subsets, which include but are not limited to:

Subset #1: {0, 1} relating to tradeoffs between cost and design life;

Subset #2: {0, 2}, relating to tradeoffs between cost and performance; and

Subset #3: {0, 3}, relating to tradeoffs between cost and luxury.

Subset #4: {1, 2}, relating to tradeoffs between design life and performance.

Subset #5: {1, 3}, relating to tradeoffs between design life and luxury.

Subset #6: {0, 1, 2}, relating to tradeoffs among cost, design life, and performance.

Subset #7: {1, 2, 3}, relating to tradeoffs among design life, performance, and luxury.

Additional subsets are available, but are not listed for brevity.

The plurality of subsets may collectively define the total dimensions for an unbiased optimization for the four problem objectives of cost, design life, performance, and luxury.

For this restricted search, a decision maker may only be interested in three tradeoffs between (1) cost and design life, (2) cost and performance, and (3) cost and luxury. Accordingly, only subsets #1 ({0, 1}), #2 ({0, 2}), and #3 ({0, 3}) may be selected, which may form the plurality of declared sub-dimensional subsets. For purposes of this restricted search, there may also be a population that includes at least five solutions (e.g., chromosome data structures), as illustrated in Table II. A snapshot of the domination rank arrays at a particular generation/iteration is also illustrated for each of the five solutions in Table II. Recall that a rank array may have a dimensionality or include a number of dimensions equal to the total number of subsets in the plurality of declared sub-dimensional subsets—in this example, three declared subsets. Accordingly, in this case, there may be three ranks in the rank array, where each rank corresponds to one of the three declared subsets, according to an example embodiment of the invention.

TABLE II

| Solution | Domination rank |
|---|---|
| 1 | [1, 5, 5] |
| 2 | [2, 3, 3] |
| 3 | [2, 2, 2] |
| 4 | [1, 2, 3] |
| 5 | [8, 1, 7] |

To select a parent chromosome data structure, two of these solutions, for example solutions 1 and 2, may be pulled from the population and may compete in a tournament. A domination check may be performed for each subset. Based upon the domination check, solution 2 may be dominated relative to solution 1 in Subset #1 (cost versus design life: {0, 1}), and therefore, solution 1 receives 10 points, using the scoring scheme of Table I, because it has a domination rank of 1 in that subset. Solution 1 may be dominated relative to solution 2 in subsets 2 and 3 (cost versus performance: {0, 2}, and cost versus luxury: {0, 3}), and therefore solution 2 receives 6 points, again using the scoring scheme of Table I, because it has a domination rank of 3 in each of these subsets. In this case, there is a clear winner: solution 1 with a point score of 10, and which is identified as the overall winning chromosome data structure. However, if there had been a point tie, diversity metrics such as the average crowding distance described herein may be used to determine the winner of the tournament. The process may be repeated to select another overall winning chromosome data structure to produce a pair of chromosome data structures for receipt by block 208.

In another example embodiment, to select another parent chromosome data structure, two additional solutions, for example solutions 3 and 4, may be pulled from the population and may compete in a tournament. A domination check between the two solutions may be performed for each subset. Based upon the domination check between the two solutions (e.g., not among an entire population as when the domination rank in Table II was previously determined), solution 3 is non-dominated with respect to solution 4 in Subset #1. Accordingly, solution 3 would "win" for Subset #1, and would accumulate 6 points. Thus, solution 3 has been elevated even though it has a lower rank (within Subset #1). With respect to Subset #2, solutions 3 and 4 can be non-dominated with respect to each other. However, in this case, diversity metrics (for each solution for Subset #2) may be used to determine that solution 4 is more diverse than solution 3 for Subset #2. In this case, solution 4 would win for Subset #2, and would accumulate 6 points. With respect to Subset #3, based upon the domination check, solution 3 dominates solution 4. In this case, solution 3 is awarded 6 points. Based upon a summation of the points, solution 3 has accumulated 12 points while solution 4 has accumulated 6 points. Thus, solution 3 would win the overall tournament even though solution 4 has at least one overall rank of 1 for a subset (and hence, solution 4 would reside in the archive checkpoint 202). It will be appreciated that even though solution 3 wins against solution 4, it does not reside in the archive checkpoint 202 because it has no subsets with an overall rank of 1. However, by winning against solution 4, it is possible that a child chromosome data structure derived at least in part from solution 3 may have an opportunity to be included in the archive checkpoint 202 if that child chromosome data structure has an overall rank of 1 for at least one subset.

C. Asynchronous Evolution

Figure 4:
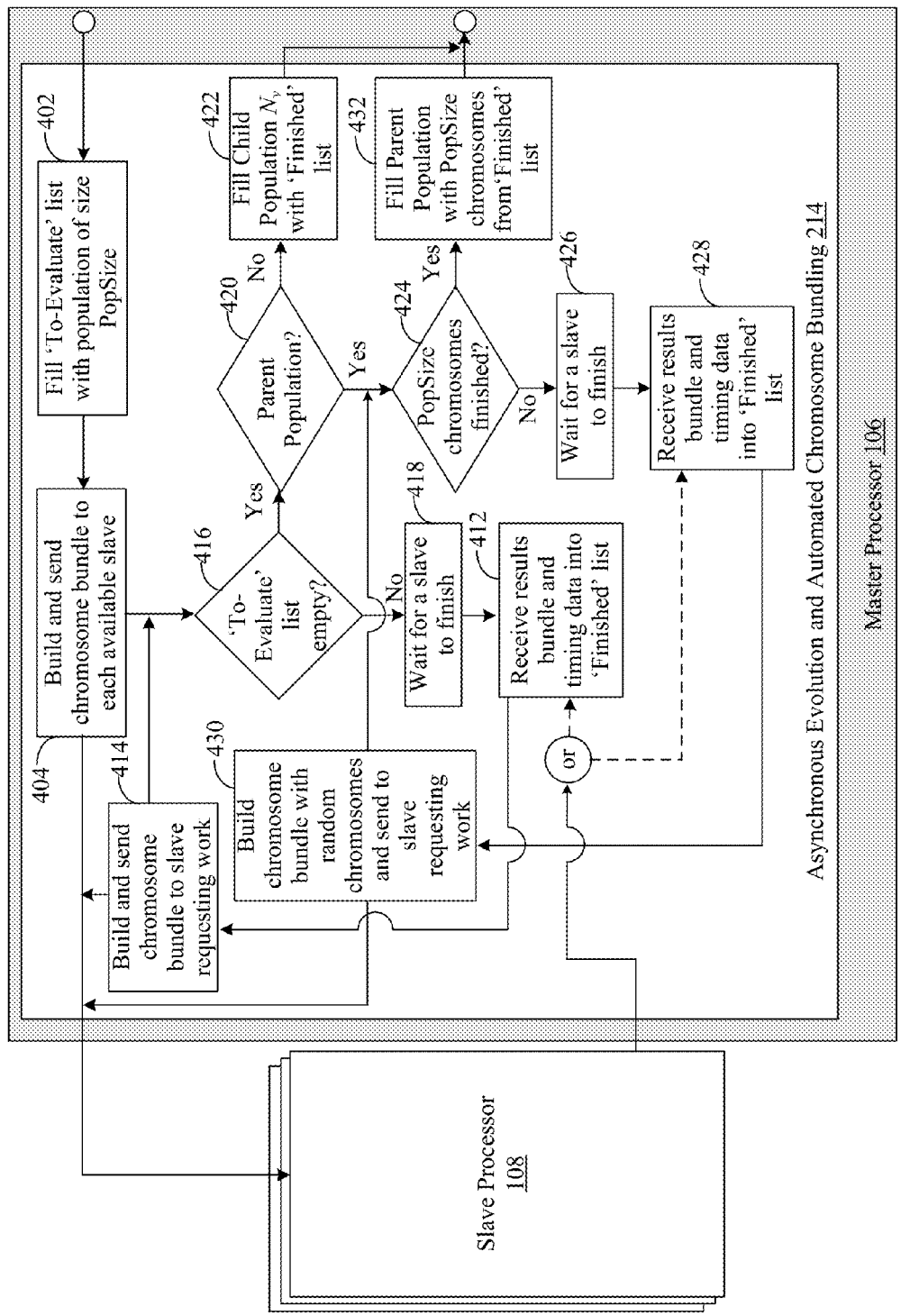
FIG. 4 illustrates an example flow diagram for an asynchronous evolution process, according to an example embodiment of the invention.

FIG. 4 illustrates an example implementation of an asynchronous evolution that may be utilized for block 214 of FIG. 2. It will be appreciated that the example asynchronous evolution process of FIG. 4 is provided by way of example only, and that many variations are available without departing from example embodiments of the invention.

The asynchronous evolution process can be utilized in conjunction with at least two example scenarios: (i) evaluation of a randomly generated initial population (e.g., block 204 of FIG. 2 or block 1020 of FIG. 10A) or (ii) evaluation of a new child population (e.g., block 212 of FIG. 2 or block 1040 of FIG. 10A).

Turning now to FIG. 4, the process begins with block 402 in which a "To-Evaluate" list or queue is filled with either (i) the randomly generated input population of parent chromosome data structures from block 204 (or block 1020), or (ii) the new child population of chromosome data structures from block 212 (or block 1040). In block 404, the master processor 106 allocates the chromosome data structures from the "To-Evaluate" list or queue to some or all of the plurality of slave processors 108. More specifically, in block 404, the master processor 106 may build a chromosome bundle for each available slave processor 108 that is to receive work. It will be appreciated that some slave processors 108 may be busy processing chromosome bundles from previous generations/iterations. The number of chromosome data structures included within each chromosome bundle may be varied without departing from example embodiments of the invention. Indeed, in some embodiments, a chromosome bundle may comprise only a single chromosome data structure.

In an example embodiment of the invention, an aspect of the bundling in block 404 may be to help keep the slave processors 108 at a fairly high (e.g., nearly 100%) utilization rate. Increasing the bundle size decreases the number of packets sent across the network and helps to minimize the time the slave processors 108 are waiting for work. However, if the bundle size is too large, a lag or delay may result in which a chromosome data structure may be potentially outdated by the evolutionary progress. The equilibrium bundle size may be dependent on the function evaluation times of the slave processors 108 and the network capability.

The chromosome bundles generated in block 404 may be allocated to the slave processors 108. Each slave processor 108 may evaluate, in accordance with a plurality of problem objective functions, the received chromosome bundle of chromosome data structures to generate a plurality of respective problem objective function values for each chromosome data structure. In addition, each slave processor 108 may also perform timing operations or calculations, including a determination of the Rolling Average Wait Time and Average Function Evaluation Time associated with the respective slave processor 108. As each slave processor 108 finishes the problem objective function evaluations and/or timing operations in block 215, the slave processor 108 may provide a results bundle (e.g., problem objective function values) and timing data to the master processor 106. The results bundle and timing data may be received in the "Finished" list or queue in block 412 or block 428, depending on the states of blocks 416, 420, and 424.

In particular, if the "To-Evaluate" list or queue is not empty (block 416), then the master processor 106 may wait for one or more slave processors 108 to finish, and the results bundle and timing data may be received into the "Finished" list or queue in block 412. Processing may then proceed from block 412 to block 414, where additional chromosome data structures from the "To-Evaluate" list or queue may be allocated in one or more chromosome bundles to one or more slave processors 108 that have previously finished processing and are waiting for additional work.

Once the "To-Evaluate" list or queue is empty, processing may proceed to block 420 to determine whether a parent population is being evaluated. If not, then the "Finished List" may be filled with the evaluated child population of chromosome data structures in block 422. On the other hand, if the parent population is being evaluated, then processing may proceed to block 424 to determine whether a predetermined population size (PopSize) has been evaluated. If so, then processing proceeds to block 432, where the "Finished List" may be filled with the evaluated parent population of chromosome data structures. On the other hand, block 424 may determine that less than the predetermined population size has been evaluated, and processing may proceed to block 426 to wait for one or more slave processors 108 to finish. Following block 426, processing may proceed to block 428 where the results bundle and timing data may be received from the just finishing slave processors 108 into the "Finished" list or queue. Processing may then proceed to block 430, where additional chromosome data structures are randomly generated and allocated in one or more chromosome bundles to one or more slave processors 108 for problem objective function evaluation.

In an example embodiment of the invention, block 430 may be utilized to keep available slave processors 108 working with randomly generated chromosome data structures until the predetermined parent population size has been reached. The modified parent population must have the prerequisite number of chromosome data structures, and some of the randomly generated chromosomes may complete processing prior to the chromosome data structures originating from the parent population; in this situation, they will become part of the modified parent population, which is received back at block 414. The remaining randomly generated chromosomes will eventually complete and become part of a subsequent modified child population. Block 430 may improve efficiency by keeping slave processors 108 more fully employed, according to an example embodiment of the invention.

It will be appreciated that many variations of FIG. 4 are available without departing from example embodiments of the invention.

D. Example Non-Domination Sorting and Archiving

Figure 10A:
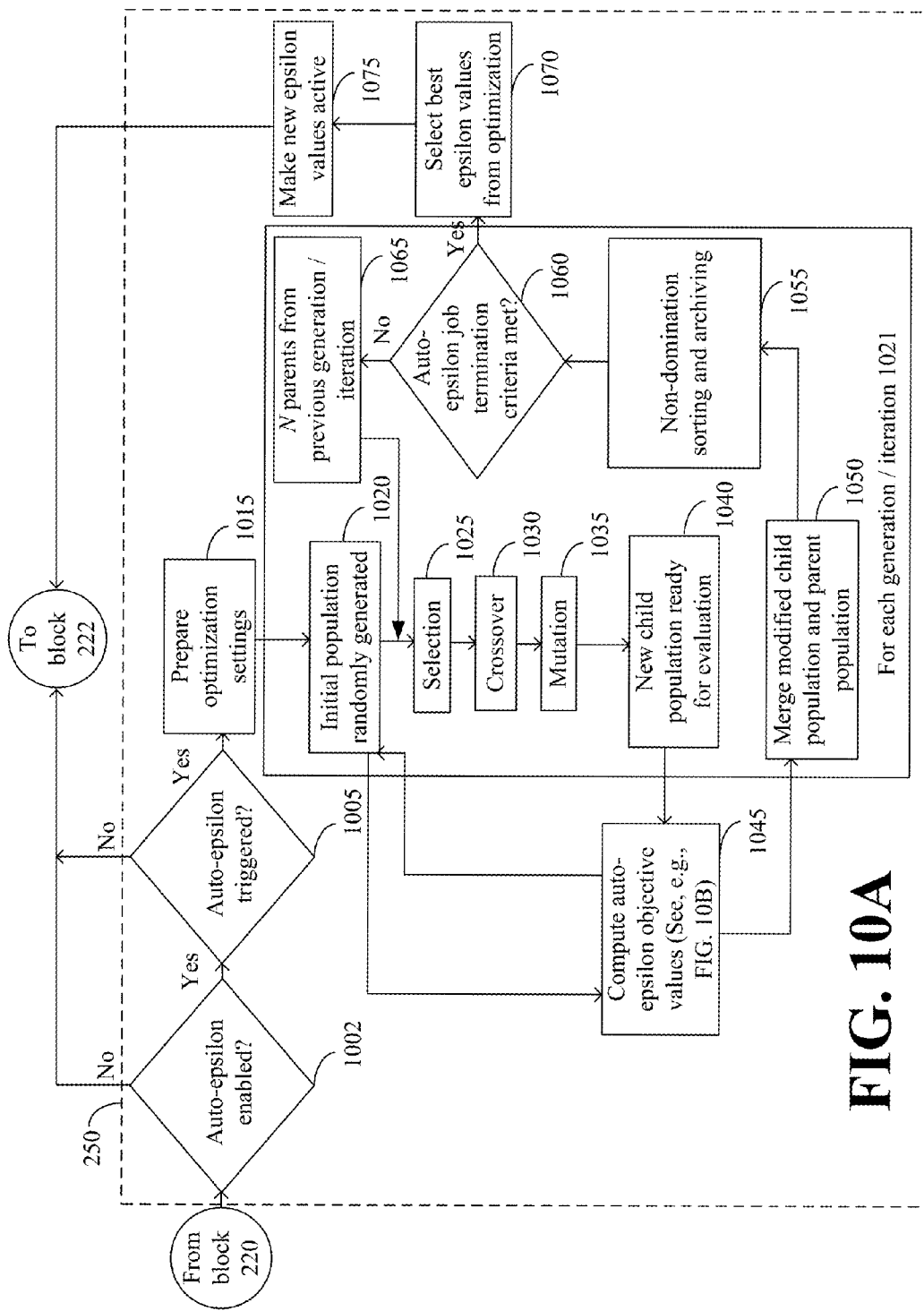
FIG. 10A illustrates a process for an example auto-adaptive control over converged results for multi-dimensional optimization, according to an example embodiment of the invention.

FIGS. 5A-5C illustrate an example non-domination sorting and epsilon non-domination sorting and archiving that may be utilized for block 218 of FIG. 2, or for block 1055 of FIG. 10A, according to an example embodiment of the invention. While FIGS. 5A-5C may provide an example implementation for block 218 of FIG. 2 or block 1055 of FIG. 10A, it will be appreciated that many other variations are available without departing from example embodiments of the invention.

Turning now to FIG. 5A, in block 505, a restricted search non-domination sorting may be performed in order to obtain, for each chromosome data structure, respective domination ranks and/or diversity metrics associated with each subset. A result of the non-domination sorting may be a domination rank array that indicates, for a particular chromosome data structure, the respective domination rank for each subset. In addition, a diversity array may be obtained that indicates, for a particular chromosome data structure, the respective diversity metrics for each subset. It will be appreciated that a given chromosome data structure has a separate diversity metric for each subset, where each diversity metric can represent the "crowding distance" to all other chromosome data structures that are in the population (e.g., population from block 216 or block 1050). An example process for block 505 will now be discussed in further detail with respect to FIG. 5B, but it will be appreciated that many variations of the process of FIG. 5B are available without departing from example embodiments of the invention.

Turning now to FIG. 5B, at block 550, a merged population or list of chromosome data structures may be received from the processing of block 216 or block 1050. Following block 550 is block 552. At block 552, a rank array and a diversity array may be initialized for each chromosome data structure. For example, if there are four subsets, then, for each chromosome data structure, there may be a rank array and a diversity array each having four positions corresponding to the four subsets. Likewise, for initialization, the values for each position of the rank array and diversity array can be set to a predetermined value (e.g., a null value or zero value).

Following block 552 is block 554, where a subset of the declared sub-dimensional subsets is selected. At block 556, non-domination sorting is performed, according to the selected subset, for the merged list of child and parent chromosome data structures to determine the respective domination ranking and diversity metrics for each chromosome data structure. According to an example embodiment, non-domination sorting may utilize the concept of domination to compare, for each selected subset, solutions provided by the merged list of child and parent chromosome data structures. A solution $x_1$ is said to dominate solution $x_2$ for a particular subset if both conditions 1 and 2 identified below are true:

Condition 1: The solution $x_1$ is no worse than $x_2$ in all problem objectives associated with the particular subset.

Condition 2: The solution $x_1$ is strictly better than $x_2$ in at least one problem objective associated with the particular subset.

If both conditions 1 and 2 are satisfied, then all of the following statements are substantially equivalent:

$x_2$ is dominated by $x_1$ for a particular subset,
$x_1$ is non-dominated by $x_2$ for a particular subset, or
$x_1$ is non-inferior to $x_2$ for a particular subset.

Figure 6:
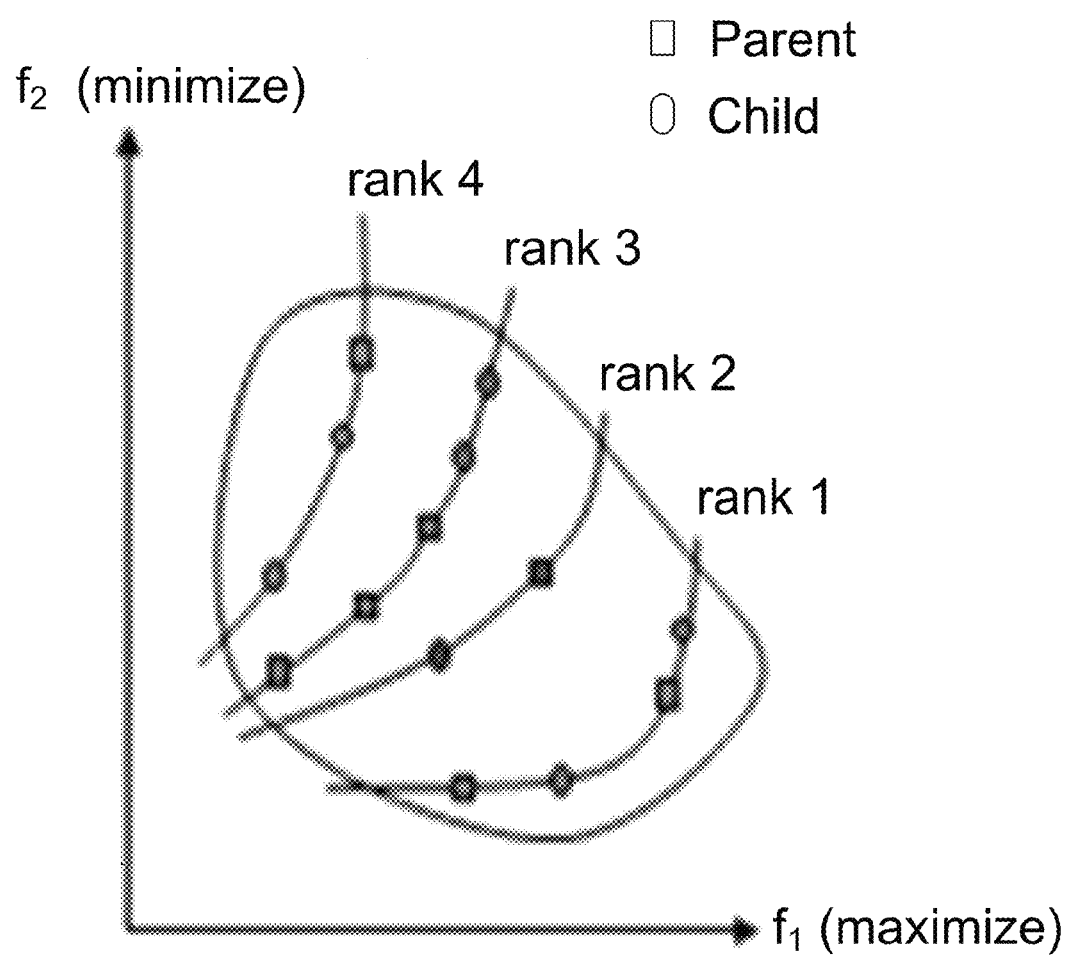
FIG. 6 illustrates a result of domination ranking applied to chromosome data structures based upon two objectives, according to an example embodiment of the invention.

Accordingly, non-domination sorting in block 556 may be performed to determine a set of chromosome data structures (e.g., designs) that are non-dominated with respect to other solutions for a particular subset when comparing the respective problem objective function values corresponding to the problem objective functions associated with a particular subset. For example, non-domination sorting may involve classifying, for a particular subset, the merged list of child and parent chromosome data structures into multiple fronts (for two problem objective functions), surfaces (for three problem objective functions), volume (for four problem objective functions), or hypervolumes (for 5+ problem objective functions) based on their respective domination rank. In an example embodiment of the invention, domination ranking may proceed by first considering, for each subset, the entire merged list of child and parent chromosome data structures. For each subset, the problem objective function values corresponding to the problem objective functions for each chromosome data structure are compared and the non-dominated solutions from the list are identified. These solutions are assigned a domination rank of 1 and temporarily removed from the merged list. The reduced merged list of child and parent chromosome data structures is then considered, and the next set of non-dominated solutions is identified and assigned a rank of 2. This process is iterated until all chromosome data structures of the merged list are assigned a domination rank for a particular subset. FIG. 6 illustrates a result of domination ranking applied to chromosome data structures based upon two problem objectives, $f_1$ (maximize) and $f_2$ (minimize), according to an example embodiment of the invention. As shown in FIG. 6, four chromosome data structures have a rank of "1"; two chromosome data structures have a rank of "2"; five chromosome data structures have a rank of "3"; and three chromosome data structures have a rank of "4". It will be appreciated that after the non-domination sorting, the same number of chromosome data structures are still members of the merged list; however, the list will have been "sorted" in the sense that chromosome data structures have been grouped into ranks which allow archive members to be identified (e.g., having a rank "1"), according to an example embodiment of the invention.

Figure 7:
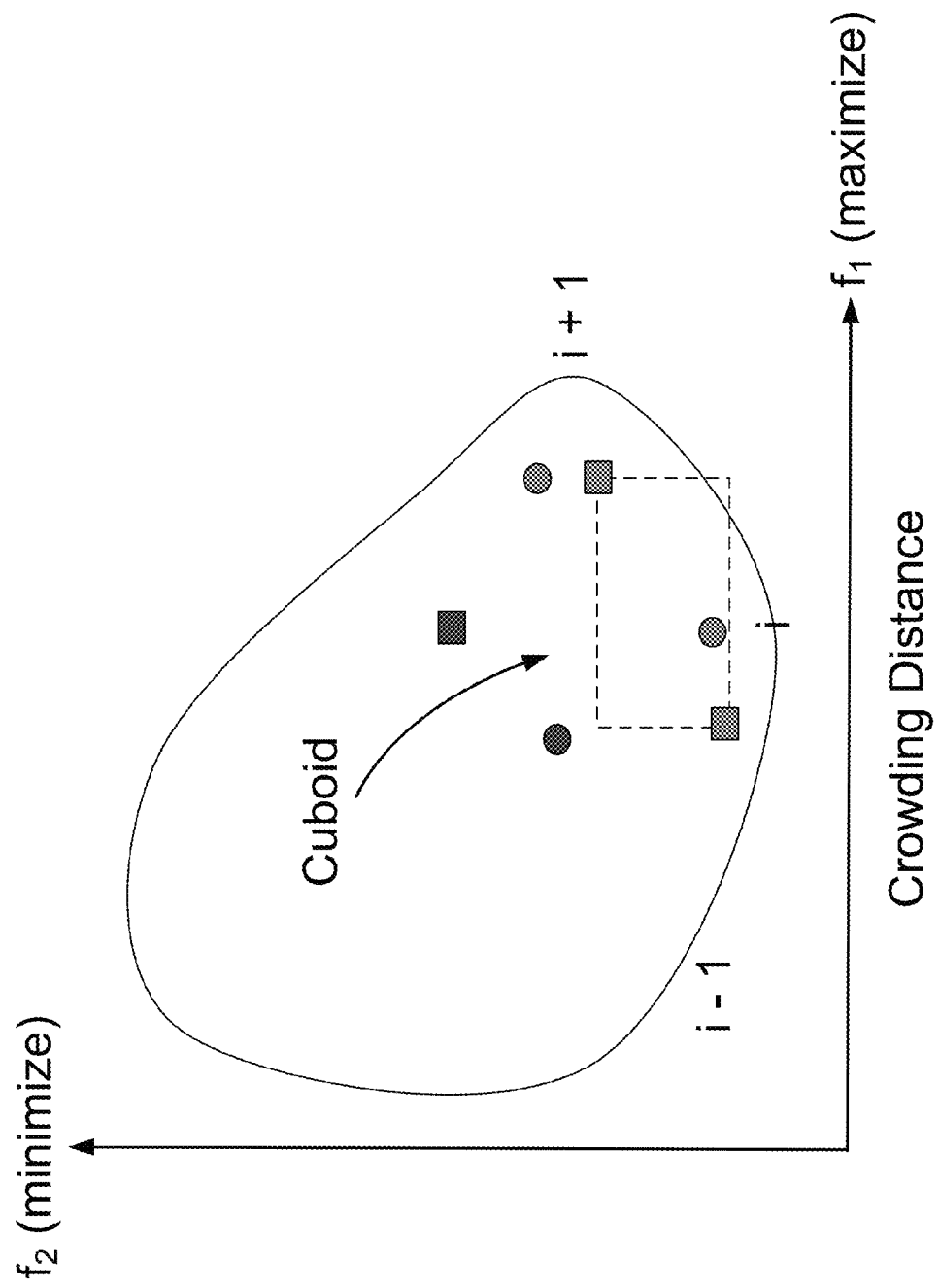
FIG. 7 illustrates an example diversity metric of a cuboid for an example chromosome data structure, according to an example embodiment of the invention.

In addition to determining a domination rank in block 556, the diversity metrics for the particular subset can also be calculated for each member of the merged list. In an example embodiment, the diversity metrics may be associated with crowding distance. For example, crowding distance may be defined as the largest distance or cuboid surrounding a solution in which no other solutions are present. FIG. 7 illustrates an example determination of a cuboid surrounding a solution, according to an example embodiment of the invention.

At block 558, the respective domination rank determined in block 556 for each chromosome data structure can then be recorded in the appropriate position (for the subset) in a rank array. An example rank array where 3 subsets are selected is illustrated below in Table III for respective chromosome data structures. For example, chromosome data structure #1 may have a rank array of [3,3,1] while chromosome data structure #2 may have a rank array of [1,4,6]. It will be appreciated that both of these chromosome data structures may be candidates for inclusion in the archive checkpoint 202 given their rank-1 in at least one element of their respective rank arrays, which helps to ensure "elitism" in the chromosome data structures stored in the archive checkpoint 202. However, these candidates will only be included in the archive checkpoint if they survive the epsilon non-domination sorting (e.g., thinning) process of block 510 described herein.

TABLE III

|  | Subset #1 Domination Rank | Subset #2 Domination Rank | Subset #3 Domination Rank |
|---|---|---|---|
| Chromosome Data Structure #1 | 3 | 3 | 1 |
| Chromosome Data Structure #2 | 1 | 4 | 6 |
| ... | ... | ... | ... |

Following block 558, processing may proceed to block 560. At block 560, the diversity metrics for each chromosome data structure can then be recorded in the appropriate position (for the subset) in a diversity array. An example diversity array where 3 subsets are utilized is illustrated below in Table IV for respective chromosome data structures. In Table IV, the diversity metrics may range from 0 to 1, where a smaller diversity metric may represent less diversity (e.g., smaller crowding distance) while a larger diversity metric may represent more diversity (e.g., larger crowding distance).

TABLE IV

|  | Subset #1 Diversity Metric | Subset #2 Diversity Metric | Subset #3 Diversity Metric |
|---|---|---|---|
| Chromosome Data Structure #1 | 0.145 | 0.787 | 0.324 |
| Chromosome Data Structure #2 | 0.256 | 0.143 | 0.897 |

It will be appreciated that while blocks 558 and 560 have been illustrated as separate blocks, they may also be combined into a single block without departing from example embodiments of the invention. Alternatively, block 560 may be performed before block 558, or blocks 558 and 560 may be performed in parallel, according to an example embodiment of the invention.

Following block 560, processing may proceed to block 562. Block 562 may determine whether the chromosome data structures have been evaluated in blocks 556, 558, and 560 with respect to all subsets in the plurality of declared sub-dimensional subsets. If any subsets remain, then processing may return to block 554 where another subset may be selected, followed by processing in blocks 556, 558, and 560. On the other hand, if no subsets in the plurality of declared sub-dimensional subsets remain, then processing may proceed to block 510 of FIG. 5A. It will be appreciated that in this situation, the rank arrays and diversity arrays may have determined values for each position corresponding to the respective subset.

Block 510 of FIG. 5A generally provides epsilon non-domination sorting (e.g., a thinning process) and archiving. An example process for block 510 will now be discussed in further detail with respect to FIG. 5C, but it will be appreciated that many variations of the process of FIG. 5C are available without departing from example embodiments of the invention.

Turning now to block 580, the non-domination sorted population of chromosome data structures from block 505 may be received along with the archive of chromosome data structures from archive checkpoint 202. At block 582, those chromosome data structures in the population which are rank-1 in at least one of the subsets (e.g., are non-dominated with respect to at least one subset), are combined with the archive of chromosome data structures to generate a merged population of chromosome data structures. The merged population may then represent the updated archive population in the archive checkpoint 202.

Following block 582 is block 584, where a subset from the plurality of declared sub-dimensional subsets is selected. At block 586, the archive population of chromosome data structures (based upon the merged population in block 582) may be thinned using epsilon non-domination sorting applied based upon the selected subset. A more detailed explanation of epsilon non-domination sorting will be discussed below with respect to FIGS. 8A-8F. However, in general terms, epsilon non-domination sorting for a particular subset may include plotting or mapping the solutions in the archive checkpoint 202 to a first epsilon value for problem objective function $f_1$ and a second epsilon value for problem objective function $f_2$, for example, if a subset is associated with the two functions, according to an example embodiment of the invention. The first epsilon value may be associated with a first epsilon spacing or step size $\epsilon_1$ associated with problem objective function $f_1$, and a second epsilon value may be associated with a second epsilon spacing or step size $\epsilon_2$ associated with problem objective function $f_2$. Each solution may then be associated with an epsilon vector or epsilon box address ($\epsilon_1$, $\epsilon_2$) corresponding to the first epsilon value and the second epsilon value. If two or more solutions have the same epsilon box address, then the epsilon non-domination sorting may retain a single solution per epsilon box address ($\epsilon_1$, $\epsilon_2$). This solution may be determined based upon whether problem objective functions $f_1$ and $f_2$ are being minimized or maximized, according to an example embodiment of the invention. The solution that is retained may be referred to as the epsilon non-dominated solution, according to an example embodiment of the invention. It will be appreciated that while only two problem objective functions are described herein for a particular subset, other example embodiments may utilize more than two problem objective functions depending on the particular subsets without departing from example embodiments of the invention.

Accordingly, in block 588, the epsilon dominated solutions of the selected subset may be removed from the archive population in the archive checkpoint 202, thereby retaining the epsilon non-dominated solutions of the selected subset. Following block 588 is block 590, which may determine whether the chromosome data structures have been evaluated in blocks 586 and 588 with respect to all subsets of the plurality of declared sub-dimensional subsets. If any subsets remain, then processing may return to block 584, where another subset may be selected, followed by processing in blocks 586 and 588. On the other hand, if no subsets in the plurality of declared sub-dimensional subsets remain, then processing may proceed to block 219 of FIG. 2.

E. Job Termination Criteria

The termination criteria described in block 219 of FIG. 2 will now be described in further detail. In an example embodiment of the invention, the termination criteria may be based upon box fitness, as described herein.

As described above, the master processor 106 may have allocated a population of chromosome data structures to the slave processors 108 for evaluation. The slave processors 108 may have evaluated the chromosome data structures according to at least two problem objective functions $f_1$ and $f_2$. Accordingly, each chromosome data structure may be associated with at least a respective first objective function value and a second objective function value corresponding to the problem objective functions $f_1$ and $f_2$.

In accordance with block 218, a first non-domination sorting (e.g., block 505 of FIG. 5A) may have been applied to the current population to remove solutions that are dominated, with respect to a particular subset, by at least one other solution (see, e.g., FIG. 5B, discussed herein). It will be appreciated that a solution is non-dominated by another solution in a subset because it is strictly better in at least one problem objective function (determined by comparing the problem objective function values) and no worse than the eliminated solution with respect to the remaining problem objective functions (determined by comparing the problem objective function values).

Following the first non-domination sorting, epsilon non-domination sorting (e.g., block 510 of FIG. 5A) may have been applied to the remaining solutions in the current population (see, e.g., FIG. 5C, discussed herein). Epsilon non-domination sorting may include, for a particular subset, plotting or mapping the remaining solutions to a first epsilon value for problem objective function $f_1$ and a second epsilon value for problem objective function $f_2$, according to an example embodiment of the invention. The first epsilon value may be associated with a first epsilon spacing or step size $\epsilon_1$ associated with problem objective function $f_1$, and a second epsilon value may be associated with a second epsilon spacing or step size $\epsilon_2$ associated with problem objective function $f_2$. Each solution may then be associated with an epsilon vector or epsilon box address ($\epsilon_1$, $\epsilon_2$) corresponding to the first epsilon value and the second epsilon value. If two or more solutions have the same epsilon box address for a particular subset, then the epsilon non-domination sorting may retain a single solution per epsilon box address ($\epsilon_1$, $\epsilon_2$). This solution may be determined based upon whether problem objective functions $f_1$ and $f_2$ are being minimized or maximized, according to an example embodiment of the invention. It will be appreciated that while only two problem objective functions are described herein, other example embodiments may utilize more than two problem objective functions without departing from example embodiments of the invention.

After the first non-domination sorting and the epsilon non-domination sorting have been performed, block 219 may determine whether to terminate a job based upon certain criteria, which may include box fitness termination criteria. In an example embodiment of the invention, a box fitness termination criteria (such as with block 219 of FIG. 2) may have two components. First, looking back over a predetermined number of previous generations/iterations for respective subsets, the total quantity of unique epsilon box addresses must remain unchanged above a predefined threshold (e.g., 90% or another user-defined percentage) for that particular subset. Second, the greater-than-or-equal-to threshold must be maintained for a predefined number of generations/iterations for respective subsets. If both of these components are met, then the job may be terminated. It will be appreciated that the first component discussed above may not be sufficient as the sole termination criteria because the box-fitness percentage change may oscillate above and below the predefined threshold (e.g., 90% or another user-defined percentage) for one or more subsets. If this occurs, then a counter utilized for the second component may be reset such that the evolutionary algorithm continues with additional generations/iterations until the box-fitness percentage change has held above the predefined threshold for the predefined number of sequential generations.

Figure 8A:
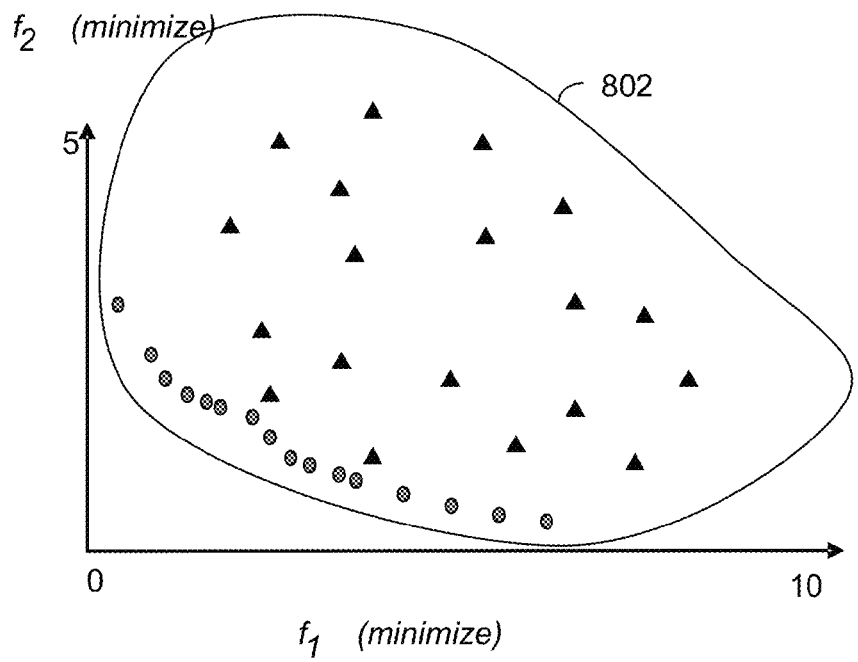
FIGS. 8A-8F illustrate a visual representation of an operation of box fitness termination criteria, according to an example embodiment of the invention.

An example box fitness termination criteria for an example subset will be graphically illustrated with respect to FIGS. 8A-8F. FIG. 8A illustrates a feasible design region 802 associated with a first problem objective function $f_1$ and a second problem objective function $f_2$. Within the feasible design region is a snapshot of a population of solutions (e.g., at block 216) of a given generation/iteration, according to an example embodiment of the invention. Based upon the goal of minimizing the first and second problem objective functions $f_1$ and $f_2$, non-domination sorting (e.g., at block 505) identifies all of the circles as being non-dominated solutions and all of the triangles as dominated solutions. The dominated solutions may be eliminated from the population or removed from further consideration, according to an example embodiment of the invention.

Figure 8B:
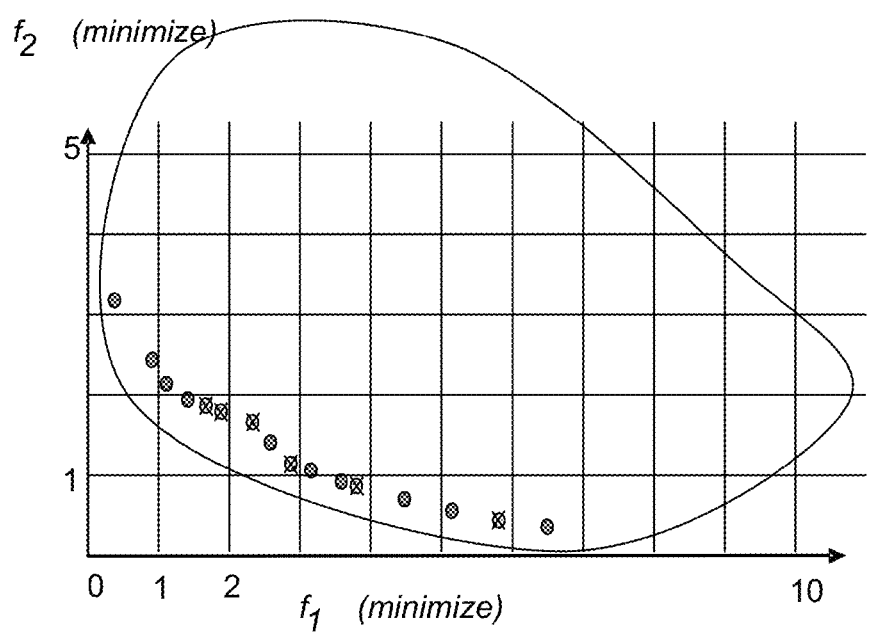

In FIG. 8B, epsilon non-domination sorting (e.g., at block 510) may be applied to the remaining solutions (e.g., non-eliminated solutions) from the first non-domination sorting of FIG. 8A. An epsilon spacing or step size can be defined for problem objective functions $f_1$ and $f_2$ to generate an epsilon grid in the problem objective space, where following epsilon non-domination sorting, only one solution exists in each block/box of the grid defined by an epsilon box address. In FIG. 8B, the epsilon non-dominated solutions for a particular subset are illustrated by circles, while the epsilon dominated (inferior) solutions are illustrated by the crossed-out circles. Because both problem objective functions $f_1$ and $f_2$ are being minimized in this example, the solution closest to the lower left corner of each block/box (as measured by distance) is kept as the epsilon non-dominated solution. It will be appreciated that in alternate embodiments, that one or both of problem objective functions $f_1$ and $f_2$ could also be maximized as well without departing from example embodiments of the invention.

Figure 8C:
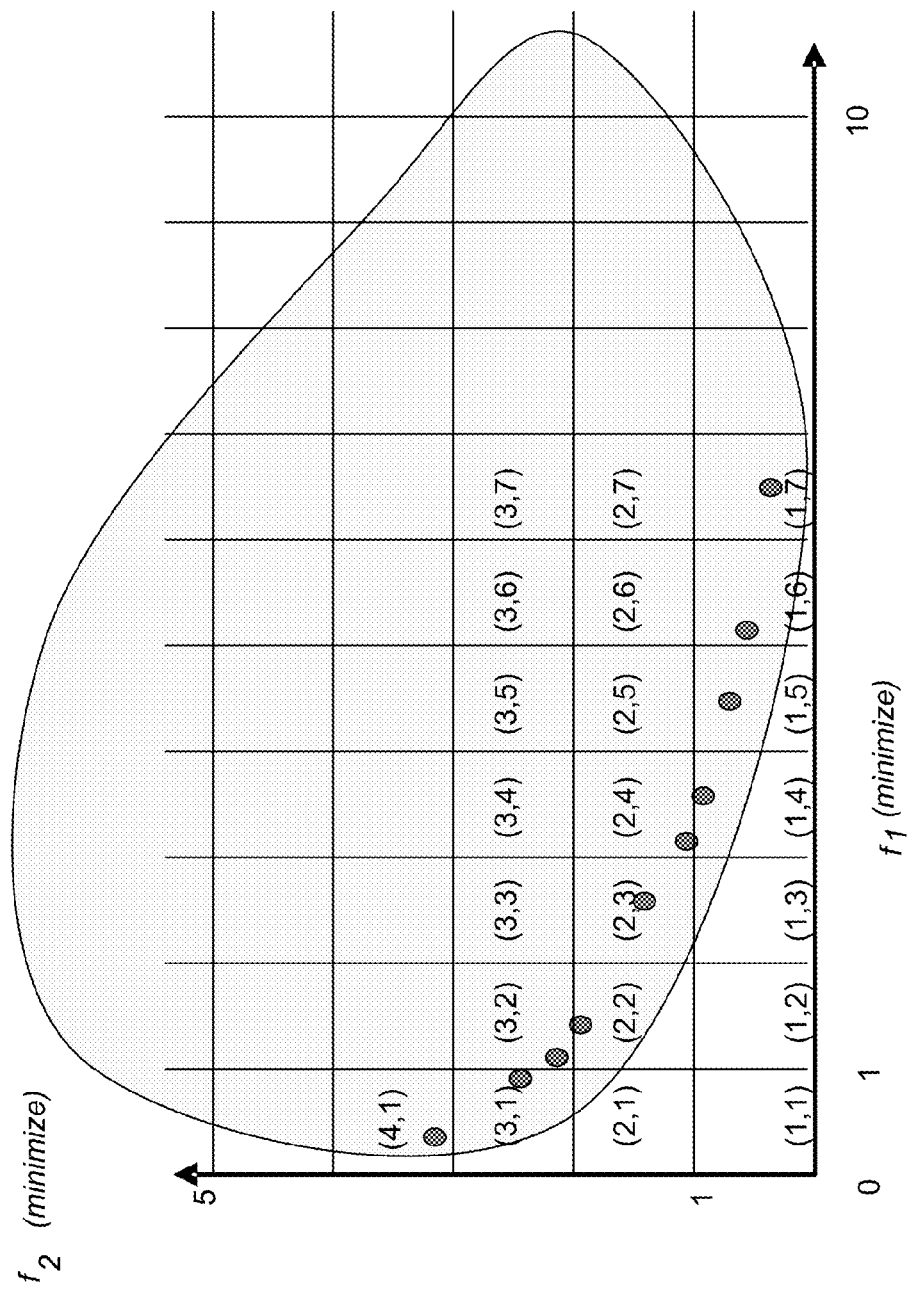

In FIG. 8C, the epsilon non-dominated solutions for a particular subset are illustrated. Each of these solutions has an epsilon box address as shown by FIG. 8C. Each solution inside a given box has a fitness based upon its domination rank and diversity, as described herein in accordance with an example embodiment of the invention. Because only one solution can exist in any given box for a particular subset during a generation/iteration (e.g., box 221), one can count how many boxes remain unchanged from iteration to iteration.

Figure 8D:
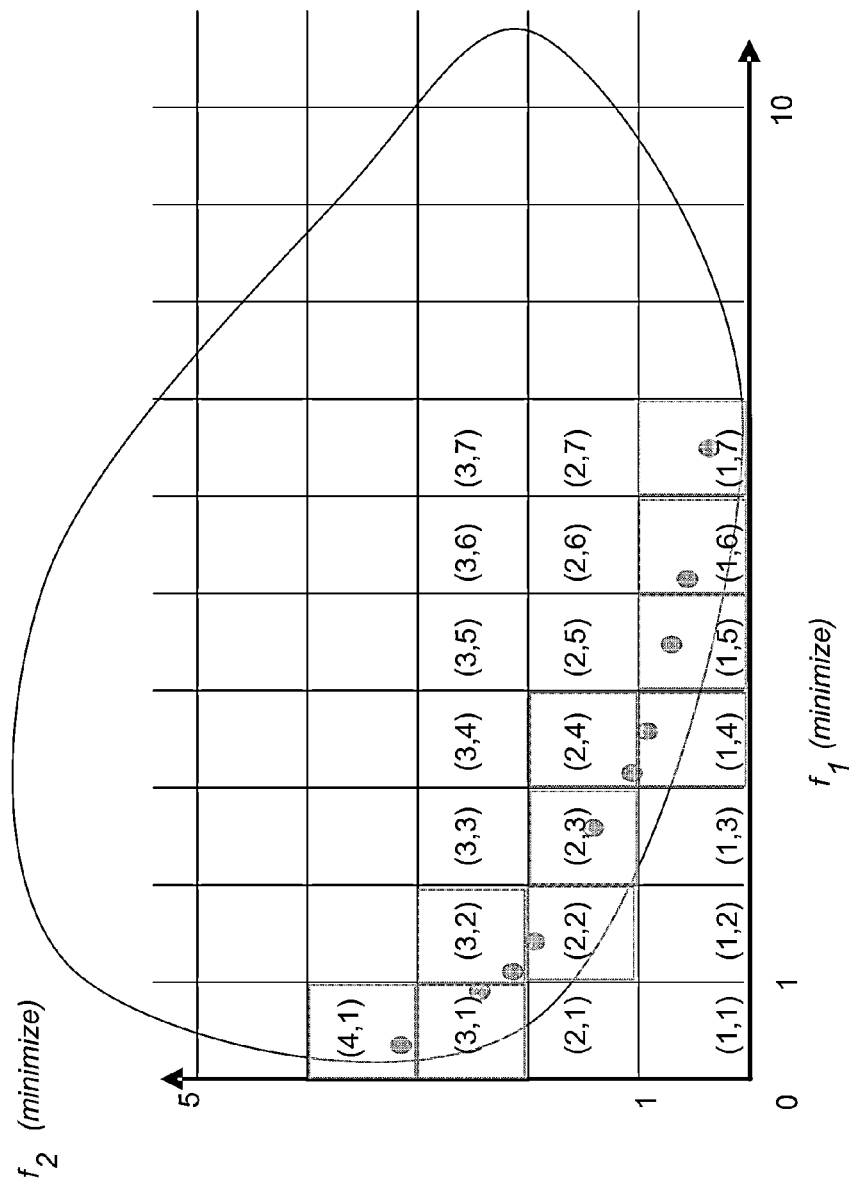

In FIG. 8D, the number of unique boxes for a particular subset of a particular generation/iteration (e.g., box 221 or 1021) is illustrated. In particular, in FIG. 8D, there are 10 unique boxes corresponding to the addresses of: (4,1), (3,1), (3,2), (2,2), (2,3), (2,4), (1,4), (1,5), (1,6), and (1,7). The addresses for each unique box may be stored in a memory or archive for the purposes of comparison to future generations.

Figure 8E:
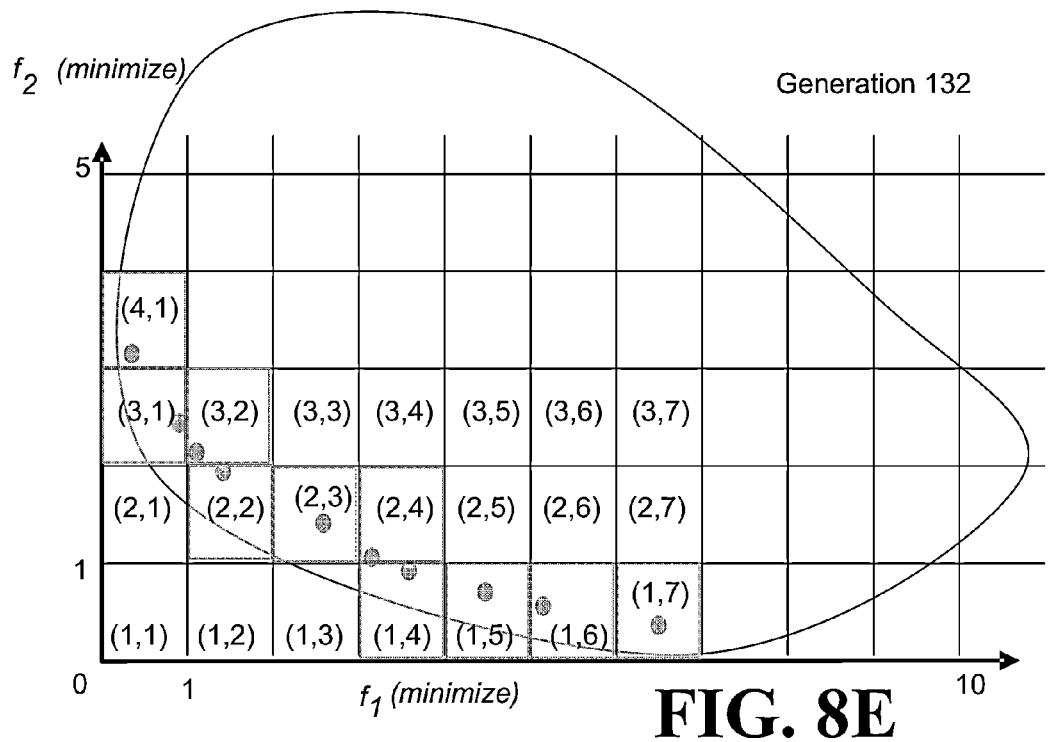
Figure 8F:
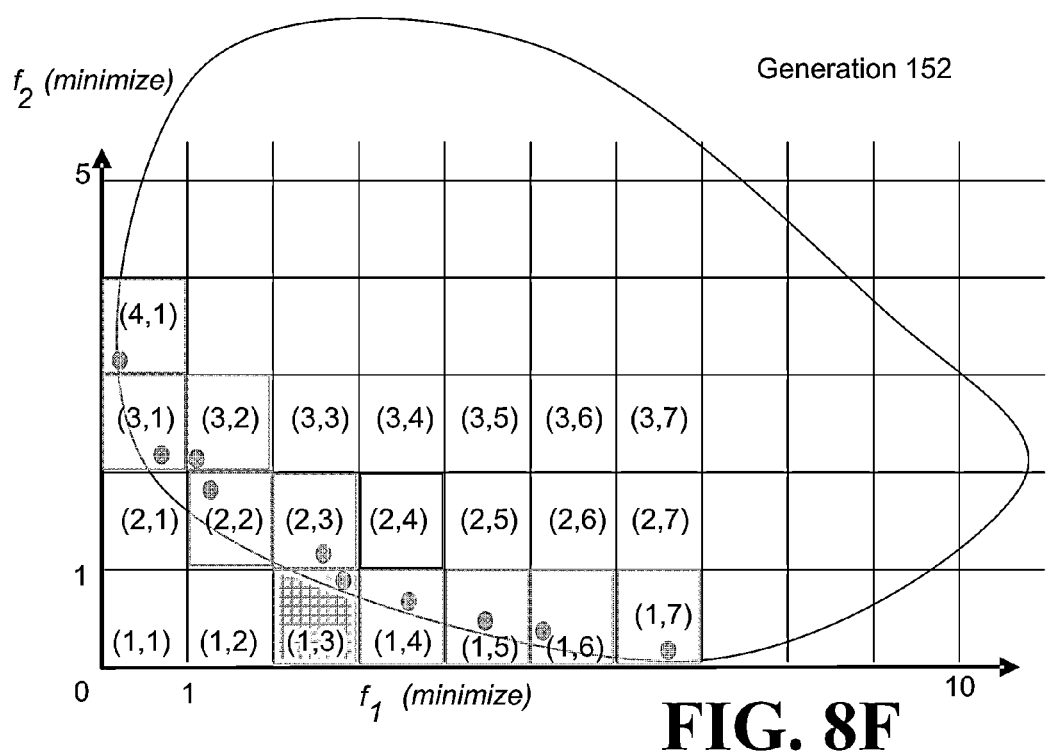

FIG. 8E illustrates a snapshot of a mostly converged population of epsilon non-dominated solutions for a particular subset at a particular generation/iteration such as generation #132. FIG. 8F illustrates a snapshot of the population of non-dominated solutions for a particular subset at a subsequent generation/iteration such as generation #152. As compared to FIG. 8E, one of the solutions in FIG. 8F has moved closer to the Pareto-optimal front, but the remaining solutions have not materially improved with regard to their box addresses for a particular subset. Note one new epsilon box address of (1,3) has been found in FIG. 8F as compared to FIG. 8E. However, this represents a 90% unchanged population between FIGS. 8E and 8F with respect to unique box addresses, which has remained above this threshold for the predetermined number of consecutive generations/iterations (e.g., last 20 consecutive generations/iterations), so there is a potential for termination of this job, if the foregoing criteria are met when applied to all subsets of the plurality of declared subsets.

It will be appreciated that while the box fitness criteria have been illustrated with respect to two problem objective functions, the box fitness can be applied where there are three or more problem objective functions without departing from example embodiments of the invention. Indeed, the box-fitness termination criteria can be generalized to n-objectives/dimensions, where 3 objectives/dimensions may be represented by volumes, and 4+ objectives/dimensions can be represented by hypervolumes.

In addition, it will be appreciated that the epsilon spacings or step sizes discussed herein may be varied in accordance with an example embodiment of the invention. For example, a larger epsilon spacing or step size may decrease the number of generations/iterations that are needed before the box-fitness termination criteria are met and a job is terminated. On the other hand, a smaller epsilon spacing or step size may increase the number of generations/iterations that are needed before the box-fitness termination criteria are met and the job is terminated.

Figure 9:
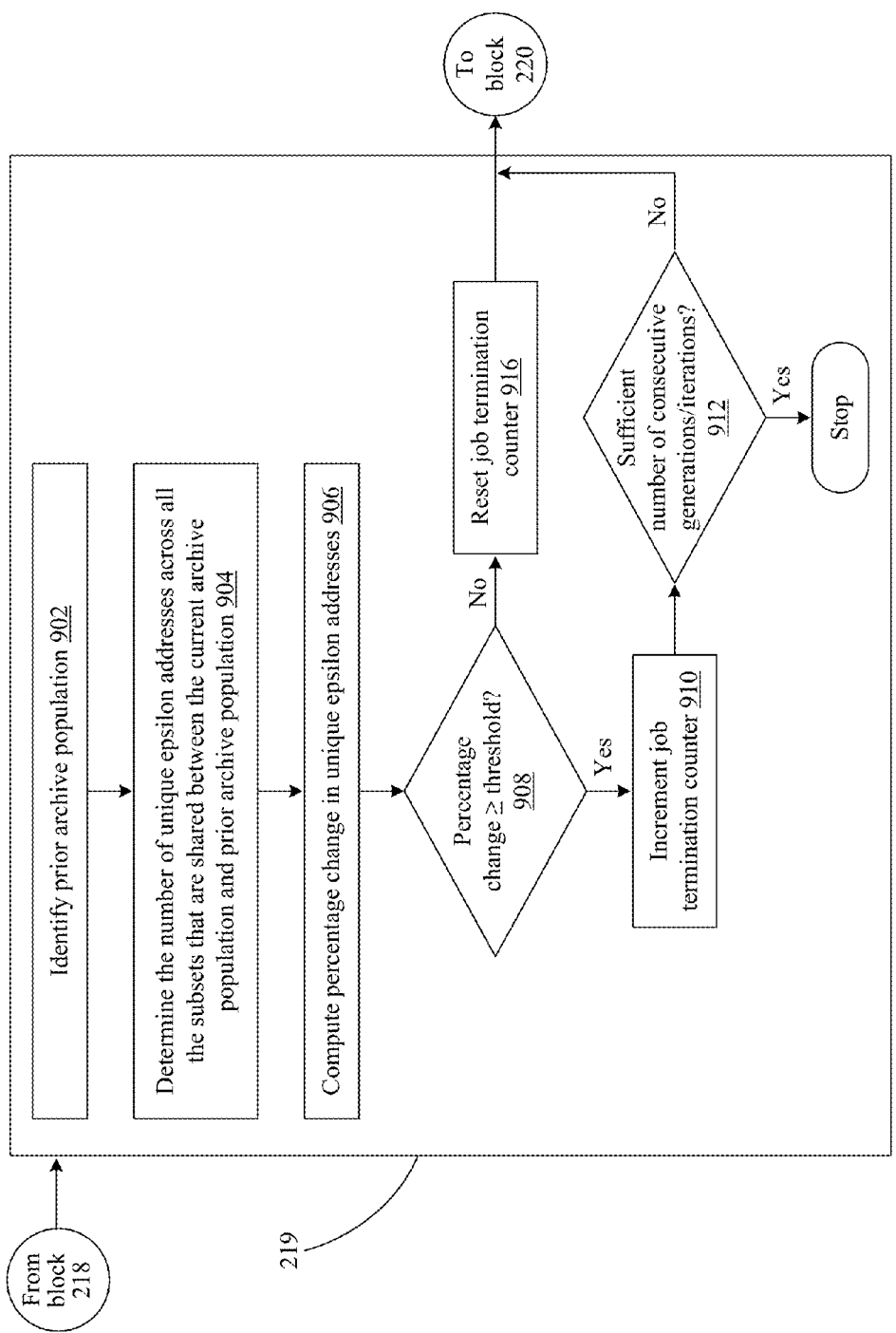
FIG. 9 illustrates an example process for determining job termination, according to an example embodiment of the invention.

FIG. 9 illustrates an example implementation for the job termination criteria of block 219 of FIG. 2. At block 902, a prior archive population of chromosome data structures for a prior generation/iteration may be identified. For example, the prior archive population may be 20 generations/iterations back from a current generation/iteration, according to an example embodiment of the invention. At block 904, the current archive population resulting from block 218 of FIG. 2 may then be compared to the prior archive population identified in block 902 on a subset-by-subset basis to determine the number of unique epsilon addresses across all the subsets that are shared between the current archive population and prior archive population. Following block 904, processing may proceed to block 906.

Block 906 may then compute a box fitness calculation to determine the percentage change in unique epsilon addresses. Generally, this box fitness calculation may account for differences resulting from changes in sizes of the archive populations across different generations or iterations. In an example embodiment of the invention, this box fitness calculation may be provided as follows, where num_Matched represents the Number of Matching Epsilon Addresses across generations:

Box_Fitness=100*(num_Matched)/((size of current archive population+size of prior archive population−num_Matched)

Following block 906, processing may proceed to block 908. Block 908 determines whether the percentage change in unique epsilon addresses has remained unchanged above a predefined threshold (e.g., 90% or another user-defined percentage) for the plurality of declared subsets between the current and prior generations/iterations. If the criteria of block 908 are not met, then a job termination counter can be reset at block 916 because the job may not be terminated until the criteria of block 908 are met for a consecutive number of generations/iterations. On the other hand, if the criteria of block 908 are met, then the job termination counter can be incremented in block 910. Following block 910, processing may proceed to block 912. Block 912 may determine whether the percentage change in unique epsilon addresses has remained the same for a predefined number of generations/iterations. To do so, block 912 may compare the job termination counter to a threshold corresponding to the predefined number of generations/iterations. If the criteria of block 912 are met, then the job is terminated. Otherwise, processing continues with block 220 of FIG. 2, as discussed herein.

F. Auto-Epsilon Adjustment

FIG. 10A illustrates a process for an example auto-adaptive control over converged results for multi-dimensional optimization (e.g., a problem optimization process), according to an example embodiment of the invention. The process illustrated in FIG. 10A may be an example implementation for block 250 introduced in FIG. 2, although many variations of FIG. 10A are available without departing from example embodiments of the invention. It will be appreciated that the example process of FIG. 10A may be associated with automatically adjusting the epsilon values for each individual problem objective to better meet at least one a priori criterion. For example, the a priori criterion can include one or more of the following:

Archive size goal for a number of solutions (e.g., converged results for multi-dimensional optimization).

Minimum spacing requirement of solutions in the objective function space for the problem optimization (e.g., don't allow two car designs that are within $X of each other).

Solution density requirements for specific regions of the objective function space (e.g., ensure high diversity of choice among the high risk solutions where high risk is a problem objective function).

Desired number of solutions within a designated region. For example, assume there is a cost and performance tradeoff for a car design. If cost and performance are of equal concern, a decision maker may "weight" cost at 0.5 and performance at 0.5, which may represents a vector (45 degree angle in the cost performance objective vector space). The vector may intersect the two dimensional cost/performance Pareto front. Where that vector intersects the cost/performance Pareto front, a designation region (e.g., rectangle or square) around that point X % (e.g., 20%) in each direction can be defined, and the number of epsilon non-dominated solutions (in the archive) in that rectangle—the "epsilon" objective— would then be the difference between the decision-maker goal (e.g., 10) and the actual number of solutions (e.g., 3) in the designated region (e.g., rectangle).

These epsilon values may be collectively referred to as an epsilon vector, according to an example embodiment of the invention. A multi-dimensional problem optimization process can then operate using the epsilon vector (e.g., the adjusted epsilon values), thereby resulting in a potential adjustment in the number of solutions in an archive such as archive checkpoint 202, according to an example embodiment of the invention.

Turning now to FIG. 10A, the example process may begin at block 1002. Block 1002 may have been reached if block 220 of FIG. 2 determines that the run termination criteria have been met, as described herein. Block 1002 may determine whether the auto-epsilon adjustment has been enabled. Block 1002 may operate based upon certain preferences submitted by the user or another decision maker prior to executing an evolutionary algorithm, as similarly described with respect to FIG. 2. For example, these auto-epsilon preferences may have been specified in an application program interface (API), according to an example embodiment of the invention.

If block 1002 determines that auto-epsilon adjustment is not enabled, then the example processing of FIG. 10A may terminate and processing may proceed to block 222 of FIG. 2, according to an example embodiment of the invention. On the other hand, if block 1002 determines that auto-epsilon adjustment is enabled, the processing may proceed to block 1005.

Block 1005 may determine whether auto-epsilon adjustment has triggered such that an example epsilon optimization process for determining or adjusting epsilon values and/or an epsilon vector should be performed. Block 1005 may include determining whether sufficient improvement has been reached in the archive goal of a archive checkpoint 202 (e.g., containing problem solutions) with the current epsilon values and/or epsilon vector. For example, block 1005 may include determining whether the size of the archive checkpoint 202 has remained stagnant or otherwise moved towards the archive goal from one or more past generations/iterations to the current generation/iteration (e.g., generation/iteration 221) of the problem optimization process. For instance, if the size of the archive checkpoint has remained stagnant for more than a predetermined number of generations/iterations, then block 1005 may determine that the auto-epsilon adjustment has triggered.

If block 1005 determines that the auto-epsilon adjustment has not triggered, then the example processing of FIG. 10A may terminate and processing may proceed to block 222 of FIG. 2, according to an example embodiment of the invention. On the other hand, if block 1005 determines that the auto-epsilon adjustment has triggered, then an example epsilon optimization process may be performed, and processing may proceed to block 1015.

Block 1015 may obtain or otherwise prepare the epsilon optimization settings for performing the example epsilon optimization process. The epsilon optimization settings may be available from an API or another data storage for storing preferences for the epsilon optimization settings. In an example embodiment of the invention, the epsilon optimization settings may indicate the amount of permissible deviation from the current epsilon values and/or epsilon vector. For example, the epsilon optimization settings may indicate that a new epsilon value generated in accordance with an example epsilon optimization process may not deviate more than a predetermined amount or percentage from a current epsilon value. Accordingly, by limiting the amount of permissible deviation, the example epsilon optimization process may be intended to operate incrementally when adjusting the epsilon values. This incremental operation can result in incrementally adjusted epsilon values and/or epsilon vector that can be used by a problem optimization process, thereby facilitating the predictable driving of problem optimization solutions towards the archive goal in an incremental manner. In addition, at block 1015, there may be other epsilon optimization settings, which can include, but are not limited to:

Identifying the maximum number of generations/iterations for performing the subsequent epsilon optimization process.

Identifying the number of genes for the epsilon optimization, where the number of genes may correspond to the number of problem objectives.

Identifying one or more epsilon optimization objectives, where each objective is associated with an archive size goal of a desired number of solutions for a declared subset of the full multi-dimensional problem.

Following block 1015 is block 1020. At block 1020, an initial population of parent epsilon chromosome data structures may be randomly generated. Each parent epsilon chromosome data structure may provide one or more genes each having a variable (e.g., an evolved variable) corresponding to a respective candidate epsilon value, each candidate epsilon value representing a respective step size or spacing for a respective problem objective. As an example, if there are three problem objectives such as (1) minimize cost, (2) maximize design life, and (3) minimize weight, there could be three candidate epsilon values corresponding to each of the three problem objectives.

It will be appreciated that the initial population of parent epsilon chromosome data structures can also be obtained from another source beyond random generation. For example, at least a portion of the initial population of epsilon chromosome data structures can also be obtained from a prior generation/iteration of the example epsilon optimization evaluating each of the plurality of child epsilon chromosome data structures according to one or more epsilon objective functions to generate respective epsilon objective function values for each child epsilon chromosome data structure, where each epsilon objective function is associated with a respective goal associated with at least one a priori criterion (e.g., an archive goal of a number of desired solutions) defined using at least a respective subset of the plurality of problem objectives, wherein each respective epsilon objective function value indicates an extent to which each respective goal can be achieved. For instance, about 50% of the initial epsilon population of parent epsilon chromosome data structures may be obtained from a prior generation/iteration of the example epsilon optimization process while about 50% of the initial epsilon population may be randomly generated.

The epsilon chromosome data structures obtained from the prior generation/iteration may have previously been evaluated in accordance with the epsilon objective functions, as will be described herein with respect to block 1045. On the other hand, the randomly generated epsilon chromosome data structures may not have been evaluated in accordance with the epsilon objective functions. In this case, the randomly generated epsilon chromosome data structures may be delivered to block 1045 to perform epsilon objective function evaluations to generate respective epsilon objective function values for each epsilon chromosome data structure. The epsilon objective functions may measure or determine an extent to which each respective a priori criterion (e.g., goal of a desired number of solutions) can be achieved.

Accordingly, having received or obtained the initial population of parent epsilon chromosome data structures in block 1020 or from a previous generation/iteration, a process may be performed in order to generate a child population of epsilon chromosome data structures based upon these parent epsilon chromosome data structures. To do so, processing may proceed from block 1020 to block 1025.

At block 1025, two pairs of epsilon chromosome data structures (i.e., a total of four epsilon chromosome data structures grouped as two pairs) may be selected from the parent epsilon population. In an example embodiment of the invention, two pairs of epsilon chromosome data structures may be selected, perhaps with equal probability based upon a uniform distribution of the input epsilon population. Alternatively, two pairs of epsilon chromosome data structures may be selected using another non-uniform distribution, including a Gaussian distribution, a K-means distribution, or the like. In any case, it may be possible that a particular parent chromosome data structure may be present in two or more selected pairs of parent chromosome data structures, according to an example embodiment of the invention.

Still referring to block 1025, each of the two selected pairs of epsilon chromosome data structures may be subject to a respective crowded tournament selection process. An example tournament selection process in accordance with an example embodiment of the invention may occur by first selecting two pairs with equal probability based upon a uniform distribution of the input epsilon population. Then each pair of epsilon chromosome data structures competes in a tournament where the individual with the best fitness is retained. It will be appreciated that best fitness may be determined according to domination rank and where the domination rank is the same, the greatest crowding distance (e.g., solution separation) wins the tournament. The winners of each tournament become the two parent epsilon chromosome data structures resulting from the selection process of block 1025. It will be appreciated that a predetermined number of pairs of parent epsilon chromosome data structures may be selected in block 1025. It will also be appreciated that a particular parent epsilon chromosome data structure may be present in two or more selected pairs of parent epsilon chromosome data structures, according to an example embodiment of the invention.

Following block 1025, the epsilon chromosomes in selected pairs of parent epsilon chromosome data structures may be subject to one or more evolutionary operators to generate a plurality of child epsilon chromosome data structures, according to an example embodiment of the invention. Two example evolutionary operators are illustrated by blocks 1030 and 1035. For example, block 1030 illustrates a crossover evolutionary operator in which a portion of the parameter values or "gene" values may be exchanged between epsilon chromosomes in selected pairs of parent epsilon chromosome data structures to generate new pairs of epsilon chromosome data structures. In an example embodiment of the invention, the crossover evolutionary operator may be capable of performing crossover using integer or non-integer numbers (e.g., double precision numbers, etc.), binary representation of numbers, letters, and/or symbols. As another example, block 1035 illustrates a mutation evolutionary operator in which a parameter value or gene value (e.g., an evolved variable value) in an epsilon chromosome of an epsilon chromosome data structure may be varied or otherwise changed to another value by a mutation.

It will be appreciated that the crossover evolutionary operator and the mutation evolutionary operator need not necessarily be applied to genes of each received epsilon chromosome in the epsilon chromosome data structure. In an example embodiment of the invention, only a portion or percentage of the received epsilon chromosomes in the epsilon chromosome data structures in blocks 1030 and 1035 may have their genes crossed-over or mutated, respectively. The respective portions or percentages that are crossed-over and/or mutated may be predetermined or dynamically varied during operation of the evolutionary algorithm, according to an example embodiment of the invention. For example, a first predetermined portion or percentage (e.g., 50%-80%) of the received epsilon chromosomes of the epsilon chromosome data structures may have genes that are crossed over in block 1030 while a second predetermined portion or percentage (e.g., 1%-3%) of the received epsilon chromosomes of the epsilon chromosome data structures may have genes that are mutated in block 1035. On the other hand, for dynamic variations, the respective portions or percentages that are crossed-over and/or mutated may be increased or decreased during runtime to increase or decrease the rate of evolutionary progress as desired or required. It will be appreciated that other evolutionary operators besides blocks 1030 and 1035 may be available without departing from example embodiments of the invention. Likewise blocks 1030 and 1035 may be performed in a different order than that shown in FIG. 10A or otherwise combined into a single block without departing from example embodiments of the invention.

Still referring to FIG. 10A, at block 1040, the two newly generated epsilon chromosome data structures (based upon two pairs of epsilon chromosome data structures being processed via blocks 1025, 1030, 1035) are added to the child epsilon population. While not shown in FIG. 10A, the process of blocks 1025, 1030, 1035 may repeat until enough child epsilon chromosome data structures have been produced for the child epsilon population (e.g., based upon one or more thresholds). Once enough child epsilon chromosome data structures have been produced to fill the child epsilon population, then processing may proceed to block 1045. It will be appreciated that the size of the child epsilon population may be fixed, or may be varied if desirable, according to an example embodiment of the invention.

Figure 10B:
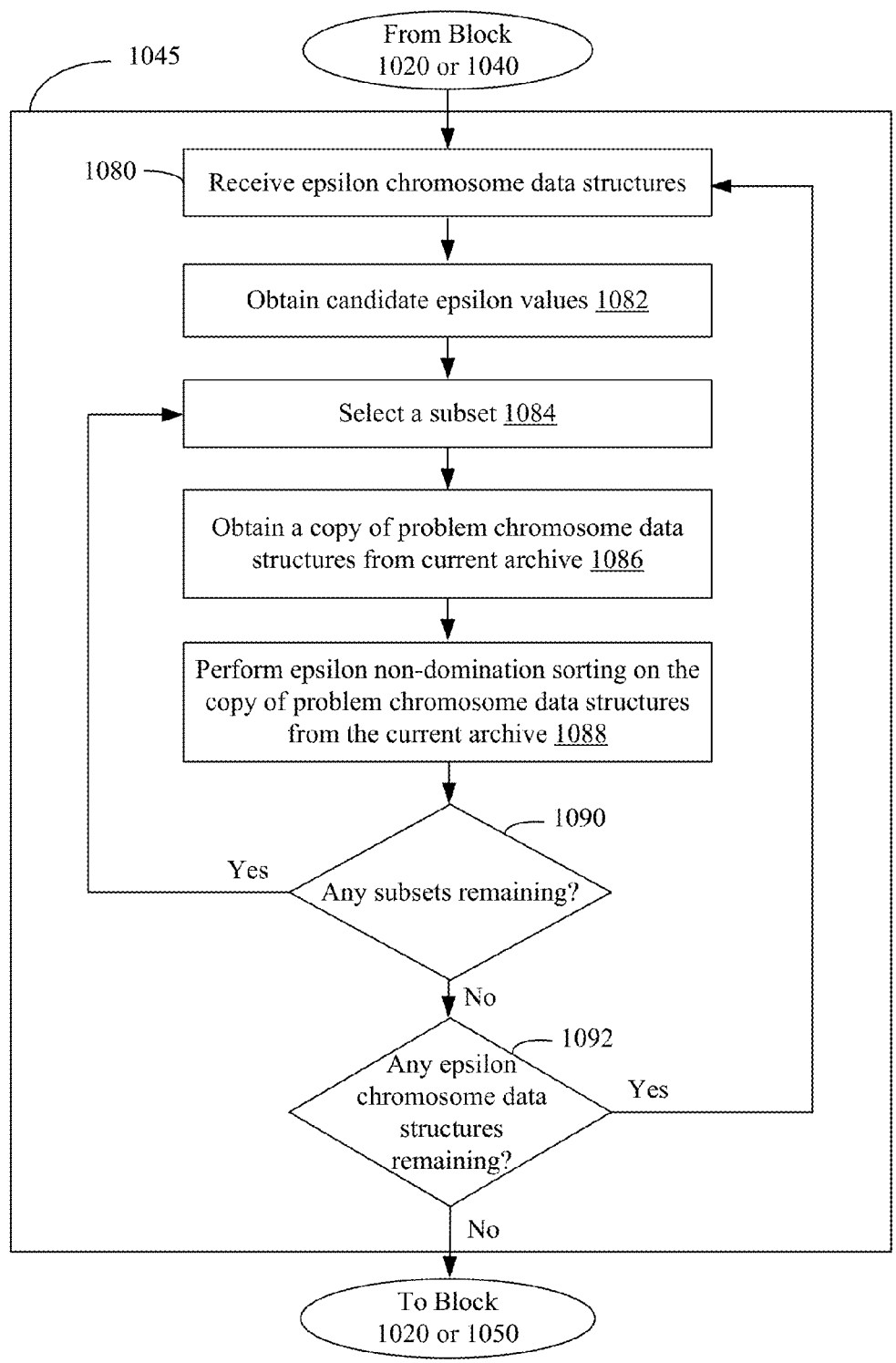
FIG. 10B illustrates an example implementation for computer auto-epsilon objective values, according to an example embodiment of the invention.

At block 1045, the child epsilon population of epsilon chromosome data structures may be evaluated. In general, block 1045 may perform epsilon objective function evaluations to generate respective epsilon objective function values for each epsilon chromosome data structure of the child population. FIG. 10B illustrates an example implementation for block 1045, according to an example embodiment of the invention. It will be appreciated that many variations of block 1045 and FIG. 10B are available without departing from example embodiments of the invention. Indeed, while FIG. 10B discloses the use of subsets, other implementations of block 1045 may apply more generally to other a priori criterion, which may or may not utilize subsets, according to an example embodiment of the invention. Furthermore, even when subsets of interest are declared or defined, there may only be one subset corresponding to a total searchable space for an optimization involving a plurality of variables. This alternative embodiment may be representative of a special case situation in which a subset actually includes all of the problem objectives.

Turning now to FIG. 10B, processing may begin at block 1080 with the receipt of one of the epsilon chromosome data structures from the one or more epsilon chromosome data structures obtained from block 1020 or 1040, as described with respect to FIG. 10A.

Following block 1080, processing may proceed to block 1082, where candidate epsilon values can be obtained from the respective genes of the received epsilon chromosome data structures. Following block 1082, processing may proceed to block 1084, where a particular subset of one or more subsets may be selected. For example, as described herein, if there is a plurality of subsets, then each subset may have a different combination of problem objectives, and thus define a respective problem search subspace.

Following block 1084 is block 1086 where a copy of the problem chromosome data structures may be obtained from a current archive associated with the problem optimization. For example, this current archive can correspond to the archive checkpoint 202 of FIG. 2, according to an example embodiment of the invention. It will be appreciated that these problem chromosome data structures may have been provided in the archive checkpoint 202 based upon one or more generations/iterations 221 of the example problem optimization.

Following block 1086 is block 1088. In particular, block 1088 may include performing epsilon non-domination sorting on the copy of problem chromosome data structures from the current archive. It will be appreciated that this epsilon non-domination sorting, as similarly described herein, may be performed using the candidate epsilon values obtained from block 1082. Likewise, the epsilon non-domination sorting will be performed in accordance with the search space defined by the subset selected at block 1084. For example, the candidate epsilon values determine a step size or spacing to determine the number of solutions in the current archive that can be thinned in accordance with the step size or spacing for a particular subset. Accordingly, the epsilon non-domination sorting can determine the number of unique solutions that are available for a given subset based upon the candidate epsilon values. An objective function can then determine the extent to which a respective a priori criterion (e.g., a goal of a desired number of solutions) can be met. Accordingly, an objective function value can indicate the extent to which the candidate epsilon values (of an epsilon chromosome data structure) can meet the respective a priori criterion (e.g., desired number of solutions for a given subset).

Following block 1088 is block 1090, where a determination is made whether the candidate epsilon values need to be considered in the context of another subset that defines another respective problem search space. If so, then processing may return to block 1084, where another subset may be selected. On the other hand, block 1090 may determine that no other subsets remain for consideration and processing may proceed to block 1092. Block 1092 may include determining whether any additional epsilon chromosome data structures remain for consideration. If any epsilon chromosome data structures remain for consideration, then processing may return to block 1080, where another epsilon chromosome data structure may be received or retrieved for processing, as described above. Otherwise, if no additional epsilon chromosome data structures remain for consideration, then the processing of block 1045 may terminate and processing may return to block 1050 (or alternatively, to block 1020) of FIG. 10A, according to an example embodiment of the invention. It will be appreciated that upon termination of block 1045, each epsilon chromosome data structure may include epsilon objective function values for each subset under consideration.

Returning now to FIG. 10A, at block 1050, the child epsilon population and the parent epsilon population (e.g., randomly generated and/or from prior generation/iteration) may be combined to form a combined epsilon population. Following block 1050, processing may proceed to block 1055.

Block 1055 may include performing non-domination sorting to determine a set of elite epsilon solutions, according to an example embodiment of the invention. In an example embodiment, block 1055 may include one or more processes for determining a set of elite epsilon solutions. For example, there may be a first domination sorting process and/or a second epsilon non-domination sorting process, which may be implemented as a single process in some embodiments. According to an example embodiment, the first non-domination sorting process may utilize the concept of domination to compare solutions provided by the combined epsilon population. A solution $x_1$ is said to dominate solution $x_2$ if both conditions 1 and 2 identified below are true:

Condition 1: The solution $x_1$ is no worse than $x_2$ in all objectives.

Condition 2: The solution $x_1$ is strictly better than $x_2$ in at least one objective.

If both conditions 1 and 2 are satisfied, then all of the following statements are substantially equivalent:

$x_2$ is dominated by $x_1$, $x_1$ is non-dominated by $x_2$, or $x_1$ is non-inferior to $x_2$.

Accordingly, the first non-domination sorting process in block 1055 may be performed to determine a set of epsilon chromosome data structures that are non-dominated with respect to other solutions when comparing the respective epsilon objective function values corresponding to the epsilon objective functions. For example, the first non-domination sorting may involve classifying the combined population of child and parent epsilon chromosome data structures into multiple fronts (for two epsilon objective functions), surfaces (for three epsilon objective functions), volume (for 4 epsilon objective functions), or hypervolumes (for 5+ epsilon objective functions) based off of their respective domination rank. In an example embodiment of the invention, domination ranking may proceed by first considering the entire merged list of child and parent epsilon chromosome data structures. The epsilon objective function values corresponding to the epsilon objective functions for each epsilon chromosome data structure are compared, and the non-dominated solutions from the list are identified. These solutions are assigned a domination rank of 1 and removed from the merged list. The reduced merged list of child and parent epsilon chromosome data structures are then considered, and the next set of non-dominated solutions are identified and assigned a rank of 2. This process is iterated until all members of the merged list are assigned a domination rank. In addition, an evolutionary operator providing crowded tournament selection may be applied to increase the diversity of choice among the solutions making up the fronts, surfaces, volumes, or hypervolumes. As an example, during crowded tournament selection, a solution may win a tournament if it has the highest non-domination rank, or if the ranks are equal, the solution with the better crowding distance may prevail. Crowding distance may be defined as the largest distance or cubiod/volume surrounding a solution in which no other solutions are present. The obtained elite set of epsilon chromosome data structures for the particular generation/iteration may then be available at block 1055.

Following non-domination sorting, block 1055 may also perform a second process of epsilon non-domination sorting. The epsilon non-domination sorting may be performed using epsilon values (using predefined epsilon values that are different than those specified by the genes of the epsilon chromosome data structures being evaluated) that indicate a step size or spacing that is indicative of a tolerance for each a priori criterion (e.g., an archive goal). In general, those epsilon chromosome data structures that survive epsilon non-domination sorting and that are epsilon non-dominated for at least one a priori criterion may represent the set of elite solutions for a particular generation. It will be appreciated that many other methods of determining an elite set of solutions may be available in accordance with alternative embodiments of block 1055.

Following block 1055 is block 1060. Block 1060 may determine whether the auto-epsilon job termination criteria have been met. In an example embodiment of the invention, the auto-epsilon job termination criteria may be met based upon one or more of the following:

the epsilon optimization process (e.g., blocks 1020-block 1065) running for at least a predetermined number of generations/iterations;

at least one epsilon vector being identified that is within predetermined tolerances/thresholds for meeting the archive goal(s) or other a priori criterion for a desired number of solutions for each subset.

If block 1060 determines that the auto-epsilon job termination criteria have not been met, then processing may proceed to block 1065, where the current epsilon chromosome data structures may be available as N parents for utilization with another generation/iteration of the epsilon optimization process. On the other hand, if block 1060 determines that the auto-epsilon job termination criteria are met, then processing may proceed to block 1070. At block 1070, then the best epsilon values may be selected. In an example embodiment, the best epsilon values can be selected from the epsilon chromosome data structure that is closest to meeting all of the respective archive goals for each subset. For example, the best epsilon chromosome data structure may be the one that is associated with the smallest accumulated distance from the respective archive goals.

Following block 1070 is block 1075. At block 1075, the best epsilon values obtained from the epsilon optimization process may be activated for use in the independent problem objective process described herein. In an example embodiment of the invention, the activated epsilon values can be available in an activated epsilon vector, according to an example embodiment of the invention. Following block 1075, processing may return to block 222 of FIG. 2, according to an example embodiment of the invention.

It will be appreciated that many variations of FIGS. 10A and 10B are available without departing from example embodiments of the invention.

Figure 11A:
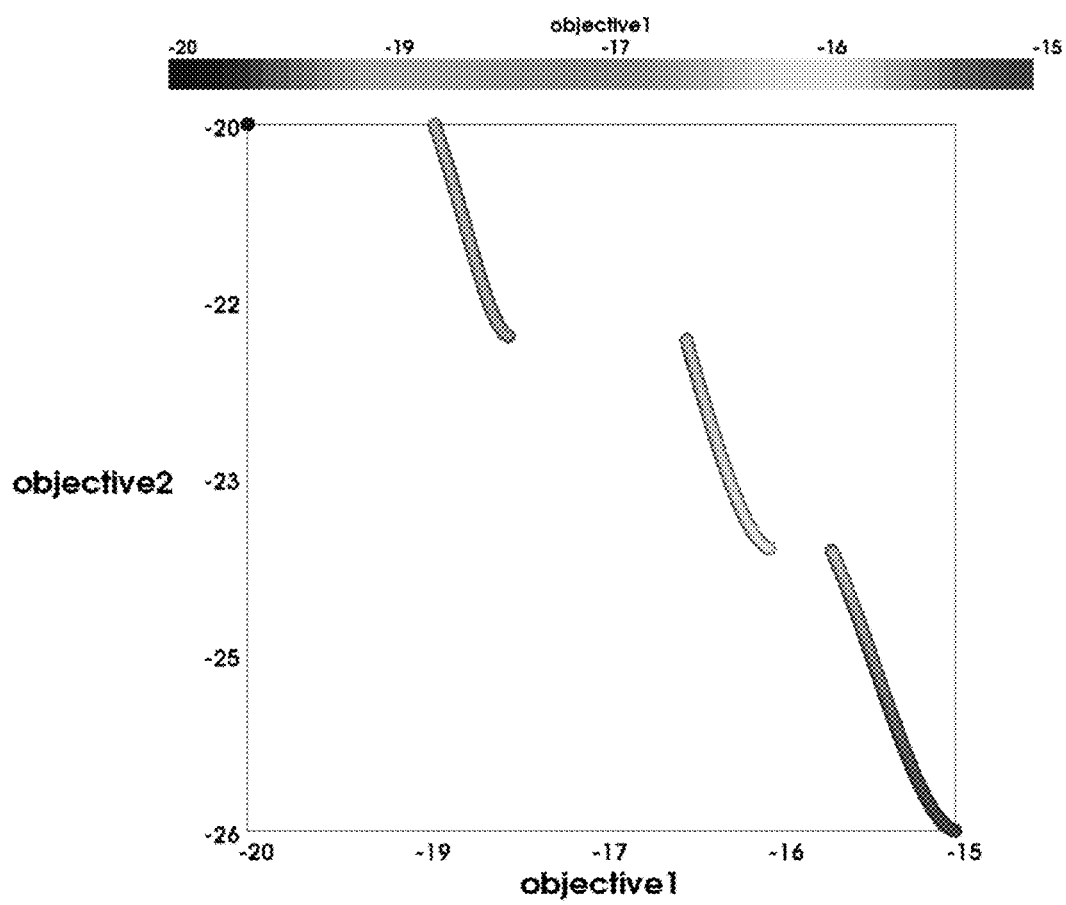
FIGS. 11A-11B are graphical illustrations of how an epsilon vector impacts a number of non-dominated solutions in the converged archive, according to an example embodiment of the invention.
Figure 11B:
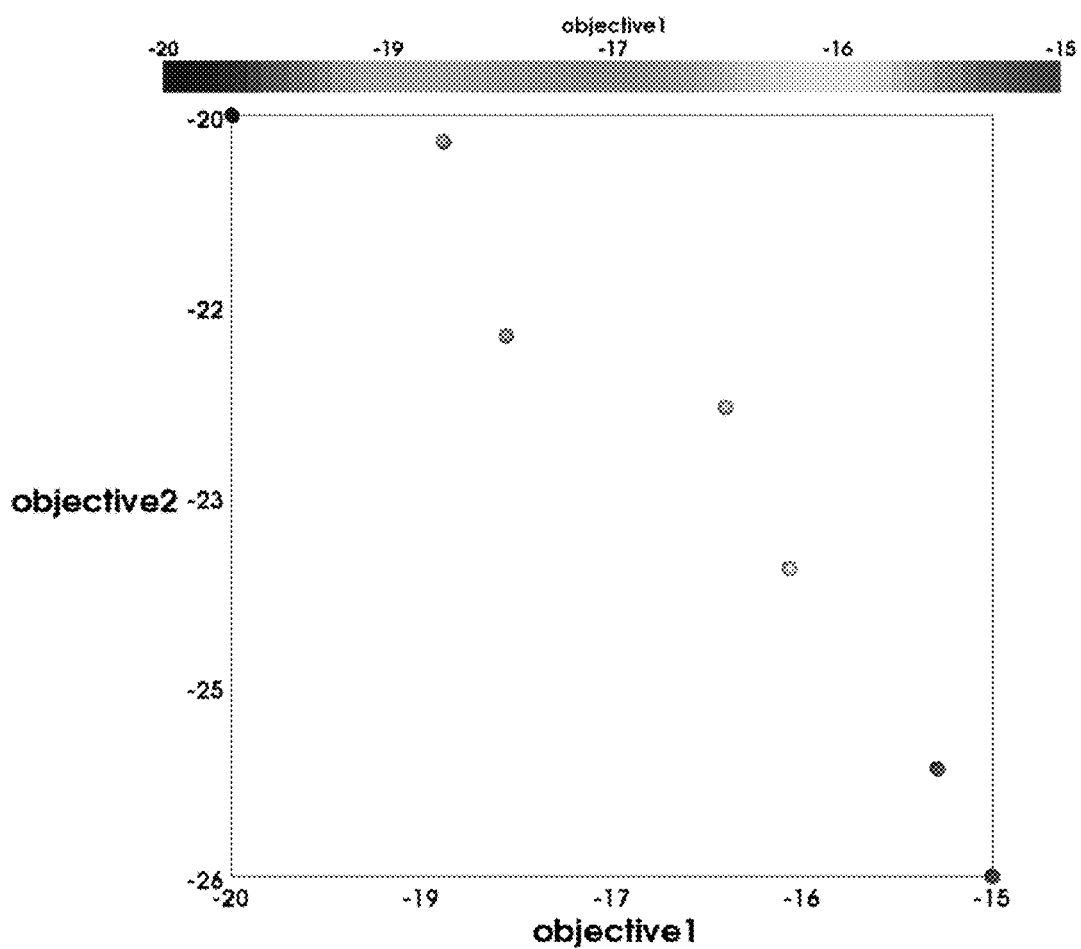

FIGS. 11A and 11B are graphical illustrations of how an epsilon vector impacts a number of non-dominated solutions in the converged archive, according to an example embodiment of the invention. In particular, FIG. 11A shows an example illustration of the non-dominated solutions in the converged archive when an epsilon vector is [0.01, 0.01] for the two objectives. In FIG. 11A, there are 217 non-dominated solutions shown. It will be appreciated that 420,956 function evaluations were performed to obtain the 217 non-dominated solutions.

On the other hand, FIG. 11B shows an example illustration of the non-dominated solutions in the converged archive when an epsilon vector is [0.0, 0.5] for the two objectives. As compared to FIG. 11A, the epsilon vector of FIG. 11B has a larger step size or spacing being utilized for the two epsilon values. In FIG. 11B, there are 7 non-dominated solutions shown. It will be appreciated that only 3,156 function evaluations were performed to obtain the 7 non-dominated solutions. Accordingly, as shown in the comparison between FIGS. 11A and 11B, there are tradeoffs among epsilon values, the number of non-dominated solutions, and the number of function evaluations required.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
    identifying an input population of parent epsilon chromosome data structures, wherein each parent epsilon chromosome data structure provides genes each having a respective candidate epsilon value, each candidate epsilon value representing a respective step size or spacing associated with a respective problem objective of a plurality of problem objectives;
    selecting one or more pairs of parent epsilon chromosome data structures from the input population of parent epsilon chromosome data structures;
    combining genes of each selected pair of parent epsilon chromosome data structures according to at least one evolutionary operator to generate a plurality of child epsilon chromosome data structures, each child epsilon chromosome data structure providing one or more genes each having a respective candidate epsilon value representing a respective step size or spacing for the respective problem objective; and
    evaluating each of the plurality of child epsilon chromosome data structures according to one or more epsilon objective functions to generate respective epsilon objective function values for each child epsilon chromosome data structure, wherein each epsilon objective function is associated with a respective goal associated with at least one a priori criterion defined using at least a respective subset of the plurality of problem objectives, wherein each respective epsilon objective function value indicates an extent to which each respective goal can be achieved, wherein the prior steps are performed by one or more computers
    wherein the identifying, selecting, combining, and evaluating steps form an epsilon optimization process, and further comprising:
    selecting an epsilon chromosome data structure from one of the evaluated chromosome data structures, wherein candidate epsilon values from the selected epsilon chromosome data structure form an epsilon vector utilized in performing a problem optimization process, wherein the problem optimization process seeks to identify a set of epsilon non-dominated solutions for each respective subset of the plurality of problem objectives, wherein a size of the set of solutions for each subset is based at least in part on the epsilon vector.

2. The method of claim 1, wherein the respective a priori criterion is associated with a number of desired solutions within a respective problem search space defined by the respective subset of the plurality of problem objectives.

3. The method of claim 2, wherein the respective problem search space defined by the respective subset of the plurality of problem objectives is a total search space defined by an entirety of the problem objectives.

4. The method of claim 2, wherein the evaluating comprises sorting an archive of possible problem solutions using the respective step size or spacing of the respective candidate epsilon value of the respective child epsilon chromosome structure and evaluating the extent to which each respective goal of the number of desired solutions within the respective problem search space can be achieved.

5. The method of claim 1, wherein the identified set of solutions is stored in an archive.

6. The method of claim 1, wherein the epsilon optimization process is triggered following a termination of a first run of the problem optimization process, wherein upon completion of the epsilon optimization process, the epsilon vector is utilized in performing a second run of the problem optimization process.

7. The method of claim 1, wherein the epsilon vector is a second epsilon vector, wherein the first run of the optimization process utilizes a first epsilon vector, wherein respective epsilon values of the second epsilon vector vary within one or more predefined ranges from epsilon values of the first epsilon vector.

8. The method of claim 1, wherein epsilon values in the epsilon vector are utilized in performing the second run of the second optimization process.

9. The method of claim 1, wherein the respective a priori criterion is associated with a minimum spacing requirement of solutions within a respective problem search space defined by the respective subset of the plurality of problem objectives.

10. The method of claim 1, wherein a number of subsets of the plurality of problem objectives being utilized for a problem optimization process is equal to a total number of the one or more epsilon objective functions.

11. The method of claim 1, wherein each problem objective is associated with a minimization or a maximization of a respective dimension.

12. The method of claim 1, wherein the at least one evolutionary operator includes one or both of a cross-over operator or a mutation operator.

13. The method of claim 1, wherein at least a portion of the identified input population of parent epsilon chromosome data structures is randomly generated.

14. A system comprising:
at least one memory that stores computer-executable instructions; and
at least one processor configured to access the at least one memory, wherein the at least one processor is configured to execute the computer-executable instructions to:
identify an input population of parent epsilon chromosome data structures, wherein each parent epsilon chromosome data structure provides genes each having a respective candidate epsilon value, each candidate epsilon value representing a respective step size or spacing associated with a respective problem objective of a plurality of problem objectives;
select one or more pairs of parent epsilon chromosome data structures from the input population of parent epsilon chromosome data structures;
combine genes of each selected pair of parent epsilon chromosome data structures according to at least one evolutionary operator to generate a plurality of child epsilon chromosome data structures, each child epsilon chromosome data structure providing one or more genes each having a respective candidate epsilon value representing a respective step size or spacing for the respective problem objective; and
evaluate each of the plurality of child epsilon chromosome data structures according to one or more epsilon objective functions to generate respective epsilon objective function values for each child epsilon chromosome data structure, wherein each epsilon objective function is associated with a respective goal associated with at least one a priori criterion defined using at least a respective subset of the plurality of problem objectives, wherein each respective epsilon objective function value indicates an extent to which each respective goal can be achieved
wherein the identifying, selecting, combining, and evaluating from an epsilon optimization process, and
wherein the at least one processor is further configured to execute the computer-executable instructions to:
select an epsilon chromosome data structure from one of the evaluated chromosome data structures, wherein candidate epsilon values from the selected epsilon chromosome data structure form an epsilon vector utilized in performing a problem optimization process, wherein the problem optimization process seeks to identify a set of epsilon non-dominated solutions for each respective subset of the plurality of problem objectives, wherein a size of the set of solutions for each subset is based at least in part on the epsilon vector.

15. The system of claim 14, wherein the respective a priori criterion is associated with a number of desired solutions within a respective problem search space defined by the respective subset of the plurality of problem objectives.

16. The system of claim 15, wherein the evaluation is performed by sorting an archive of possible problem solutions using the respective step size or spacing of the respective candidate epsilon value of the respective child epsilon chromosome structure and evaluating the extent to which each respective goal of the number of desired solutions within the respective problem search space can be achieved.

17. The system of claim 14, wherein the respective a priori criterion is associated with a minimum spacing requirement of solutions within a respective problem search space defined by the respective subset of the plurality of problem objectives.

18. The system of claim 14, wherein each problem objective is associated with a minimization or a maximization of a respective dimension.

* * * * *